United States Patent [19]
Montag et al.

[11] Patent Number: 5,920,492
[45] Date of Patent: *Jul. 6, 1999

[54] DISPLAY LIST GENERATOR FOR FIRE SIMULATION SYSTEM

[75] Inventors: Bruce C. Montag; Stephen D. Huffman, both of San Antonio, Tex.; Denise C. Varner, Orlando, Fla.

[73] Assignee: Southwest Research Institute, San Antonio, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/845,666

[22] Filed: Apr. 25, 1997

Related U.S. Application Data

[60] Provisional application No. 60/016,386, Apr. 26, 1996.

[51] Int. Cl.[6] .................................................. G06F 3/14
[52] U.S. Cl. .......................................... 364/578; 434/226
[58] Field of Search .............................. 364/578; 434/226

[56] References Cited

U.S. PATENT DOCUMENTS

| | | | |
|---|---|---|---|
| 3,675,343 | 7/1972 | Swiatosz | 434/226 |
| 4,001,949 | 1/1977 | Francis | 434/226 |
| 4,209,832 | 6/1980 | Gilham et al. | 364/578 |
| 5,374,191 | 12/1994 | Herman et al. | 434/226 |
| 5,590,062 | 12/1996 | Nagamitsu et al. | 364/578 |
| 5,598,359 | 1/1997 | Montag et al. | 364/578 |
| 5,745,387 | 4/1998 | Corby, Jr. et al. | 364/578 |
| 5,752,835 | 5/1998 | Whitmer, Sr. | 434/226 |

OTHER PUBLICATIONS

Fire–fighter—A Decision Support System for Fire Management by K F Li and E Miska; Department of Electrical and Computer Engineering, University of Bictoria, Canada V8W 3P6; May 9–10, 1991.

A Numerical Approach to the Computation of Light Propagation Through Turbid Media: Application to the Evaluation of Lighted Exit Signs by Badrinath Roysam, Andrew Cohen, Philip Getto and Peter Boyce; Industry Applications Society, 1991 Annual Meeting.

Evolving Prototype Rules and Genetic Algorithm in a Combustin Control by Runhe Huang; Comp. Sci. and Eng. Lab, The University of Aizu, 965–80. Japan; Industrial Automation and Control, 1995 IEEE/IAS Int'l Conference.

*Primary Examiner*—Vincent N. Trans
*Attorney, Agent, or Firm*—Baker & Botts, L.L.P.

[57] ABSTRACT

A method of using a computer to provide display data representing a fire. The data is derived from fire model data, so that the fire is realistically displayed with the dynamics of a real fire. Particles are generated from the model data and given location values and other parameters. Each particle becomes a display data element by virtue of being assigned a graphics primitive. The data elements are culled according to a field of view and sorted, so that they may be used for real time display rendering.

14 Claims, 3 Drawing Sheets

VIEWPOINT

WIND →

DISPLAY LIST GENERATOR FOR FIRE SIMULATION SYSTEM

RELATED PATENT APPLICATIONS

This application claims priority under 35 U.S.C. § 119 (c)(1) of provisional application No. 60/016,386 filed Apr. 26, 1996.

TECHNICAL FIELD OF THE INVENTION

This invention relates to generating a real-time photo-realistic visual display of a burning fire, that is being simulated by a physics-based model, and more particularly to a data generator that receives numerical fire data and generates a prioritized graphics display list for rendering by an image generator.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

Conventional generation of computer graphics displays involves using geometric models to represent the real world. In a world made of geometric objects, these models would suffice for rendering realistic displays.

However, many natural phenomena are not effectively represented by geometric models. For example, although fog is comprised of tiny drops of water, using a model in which each drop must be individually placed is not efficient. Furthermore, a water drop model does not accurately represent our perception of fog, which is seen as a blur in the air and not as discrete drops. See Foley, et al. *Computer Graphics* (Addison-Wesley Publishing Company, Inc. 1990) p. 1011.

Particle systems are one approach to modeling objects that cannot be easily described with geometric models. A particle system is a collection of particles that evolves over time. Particle systems have been used to generate displays of objects such as fire, and distant landscapes with trees and grass. However, a shortcoming of these existing particle systems is that they are abstract renditions of fires, not based on physical reality. Also, they do not dynamically represent the behavior of a real fire.

DETAILED DESCRIPTION OF THE INVENTION

Figure 1:
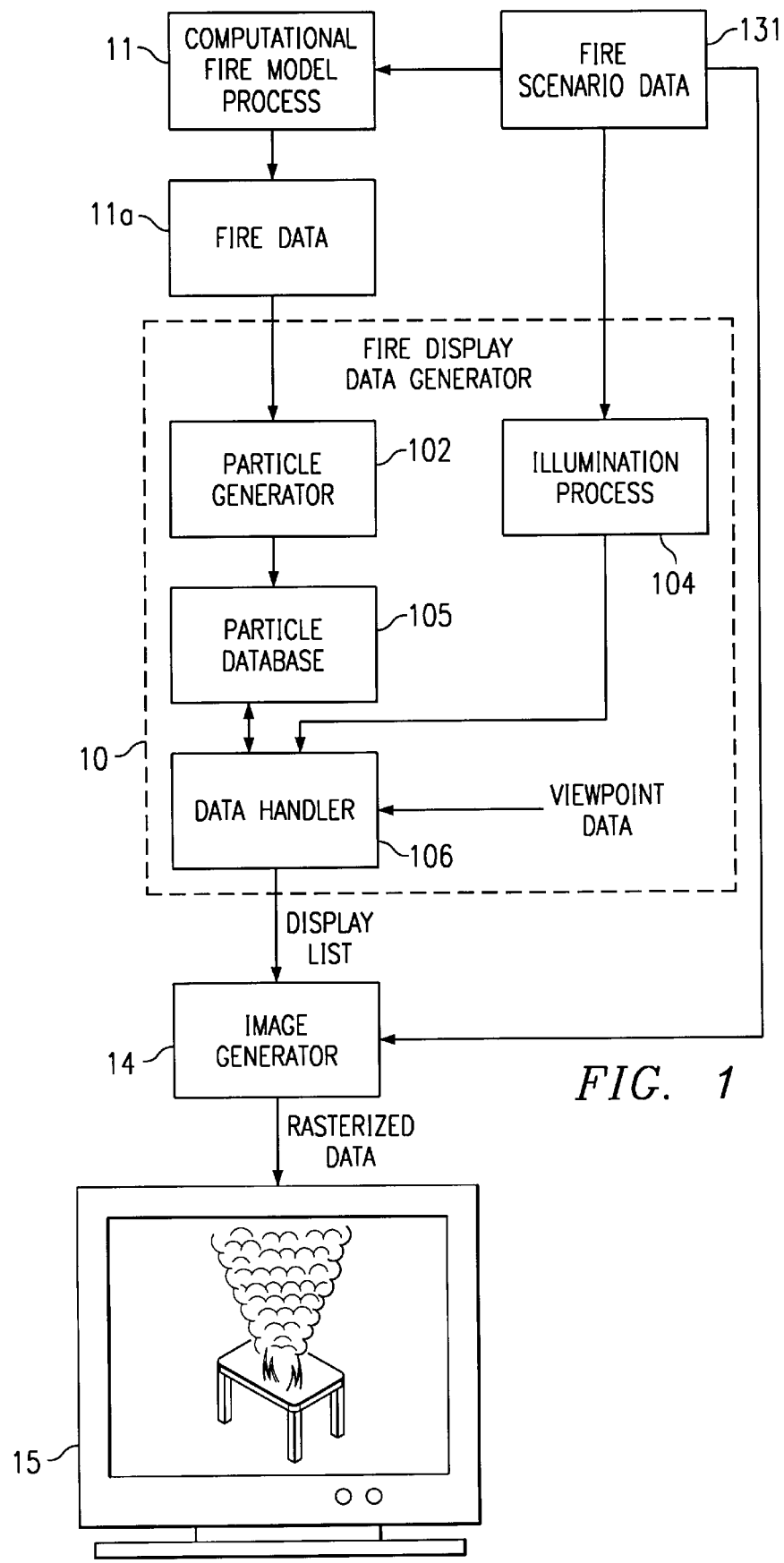
FIG. 1 is a block diagram of a fire display data generator in accordance with the invention.

FIG. 1 is a block diagram of the processing and data storage components of a fire display data generator 10 in accordance with the invention. As explained in detail below, data generator 10 uses a computational fire model to generate "particles" that represent flames or smoke. The data generator 10 assigns a graphics primitive and other parameters to each particle, thereby transforming the particles into display elements. It culls and sorts these display elements to provide a display list that can be used to generate a real-time visual image of the fire that responds to changes in the model data as the fire progresses. The components of data generator 10 reside in the memory of a computer system, and when executed, implement the method of the invention.

A typical application of data generator 10 is to provide display data to an image generator 14 that rasterizes the data for display on a display device 15. The image generator 14 could be part of a comprehensive fire simulation system that also provides fire effects such as heat and wind. The display appears to be three-dimensional and changes as the viewer's viewpoint changes.

For purposes of this description, a "fire" may include both flames and smoke, as illustrated by the display depicted in FIG. 1. A "fire" could also include other obscurants resulting from fire, such as pieces of material being blown from the fire.

A feature of the invention is that data generator 10 is capable of receiving continuous numerical outputs from a computational fire model and providing prioritized graphics data to the image generator 14 so that real-time display of the burning fire can be viewed. The embodiment of this description assumes a real time display rate of at least 30 frames per second. However, in other embodiments, single images or other frame rates could be useful.

Figure 2:
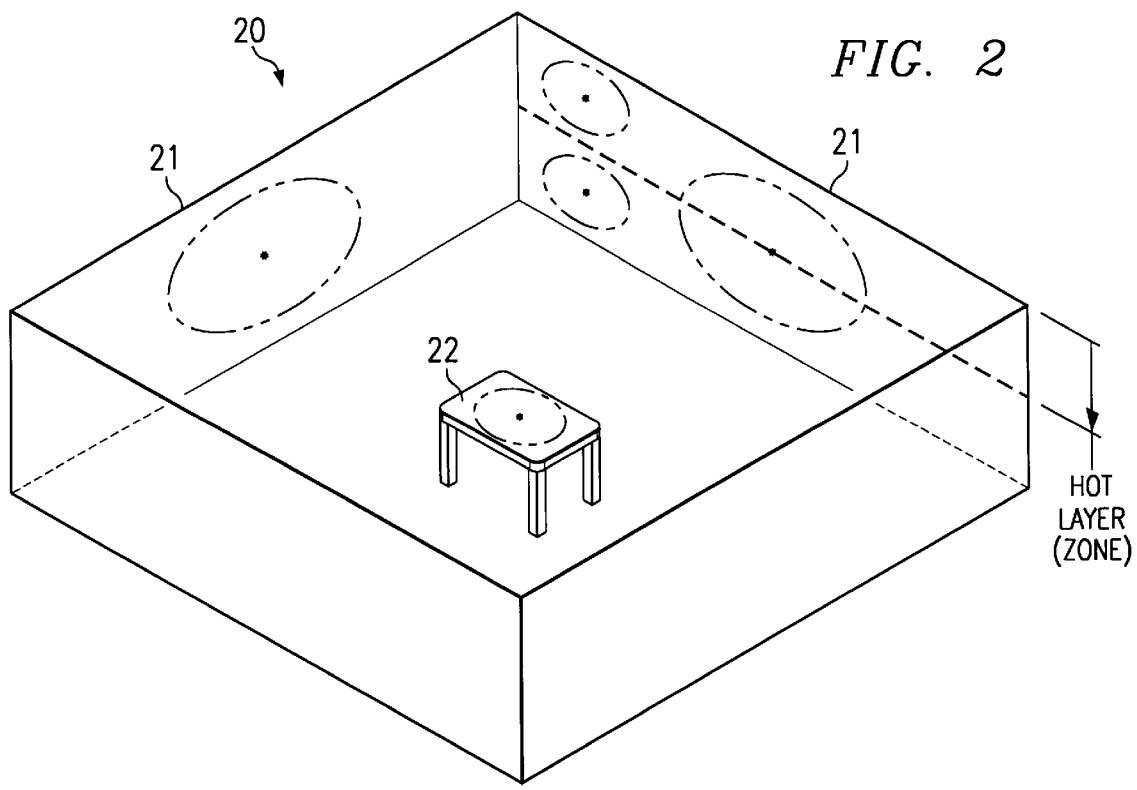
FIG. 2 illustrates an example of a computational fire model of FIG. 1.

FIG. 2 illustrates one example of the computational fire model 11 of FIG. 1. A "computational fire model" is one that mathematically describes the physical characteristics of a fire. The model predicts the behavior of a fire, from its start through its progression into a larger fire. In other words, mathematical expressions provide an algorithmical description of fire over time as determined by known physical fire phenomena. The model is thus a process, whose output at any given time describes the state of the fire at that time.

Computational fire models are used by persons such as architects, builders, fire officials, and materials researchers. Their conventional purpose is to provide data for developing methods of fire control and prevention.

For purposes of the invention, which uses the fire model to provide realistic visual displays as opposed to numerical data, any one of a number of known computational fire models could be used. Common characteristics of suitable models are the use of some sort of computational primitive to represent objects in an area of interest, the identification of the materials from which those objects are comprised, and the providing of a mass consumption rate. The mass consumption rate indicates whether an object is burning and the rate at which it is burning. It can be used to discern how much of an object has been consumed (converted to smoke) at a given time. As explained below, the computational primitives of the model can be geometric shapes (as in FIGS. 2–4) or points of a grid (as in FIG. 5).

The example of FIG. 2 is the computational fire model used for the Harvard Fire Code, a zone-type model of a fire in a confined area such as a room of a building. A number of physical data variables are associated with the room and with the objects in it. These variables include mass, temperature, rate of change in mass, radiative flux, power release by combustion, and others. Appendix A lists the variables used in the 5th Harvard Computer Fire Code.

In FIG. 2 a room 20 has walls 21 and a table 22 is in the room 20. Each of these is an object, for purposes of the model. The model's computational primitives are disks, and each object is assigned at least one disk. Disks can be aggregated or de-aggregated for computational purposes. A first wall 21 has values that exceed a certain threshold and is thus assigned more than one disk. A second wall 21 and the table 22 are also assigned disks.

The disks each have an x,y,z location and a set of associated parameters. The disks are not graphical representations but rather are for computational purposes. In other words, a particular disk might represent a table 22 because its (x,y,z) location in the room coincides with a table in the room and because its mass and material parameters are appropriate for a table, such as wood of a particular mass. As explained below, any disk (and hence its associated object) may be "on fire".

Typically the mathematical expressions of a fire model 11 will be in terms of variables, as are those of the Harvard Fire Model. The use of variables permits the model to be general. For modeling a particular scenario, the variables are assigned values, resulting in a description of a particular fire in a particular location under particular environmental conditions.

Referring again to the computer process of FIG. 1, fire scenario data 13 is provided to the fire model process 11. For an interior fire, the scenario data 13 includes a description of the room or other confined area, such as its size, its windows and doors. The scenario data 13 also specifies the materials of the room and an initial point of the fire. The data to be specified depends on the particular fire model being used. It may include environmental data such as wind, atmospheric moisture, or ambient temperature.

By accessing data in the fire scenario database 13, the fire model process 11 assigns values to its variables. The result is a fire data database 11a, which models a particular fire of interest.

Particle generator 102 accesses the fire database 11a to generate a particles database 105. Essentially, and as explained below, the particle generator 102 converts the computational data elements of the model to particles that are assigned graphics primitives, which are capable of being rendered as an image.

Illumination for the display may be implemented as a separate illumination process 104 (as illustrated in FIG. 1) or may be incorporated into the particle generation process 102 (as described below in connection with FIG. 3). In simple embodiments, the lighting may be ambient, such that the entire scene is globally illuminated in accordance with the ambient light. As an alternative to ambient lighting, lighting could be calculated by treating the sun as a point source. Each particle's intensity would be calculated from sun angle data and from factors representing complete or partial obscuration by other particles. Other lighting, ambient or point source, could be provided by the moon or artificial lighting. As explained below, illumination may also be provided by the fire itself.

Figure 3:
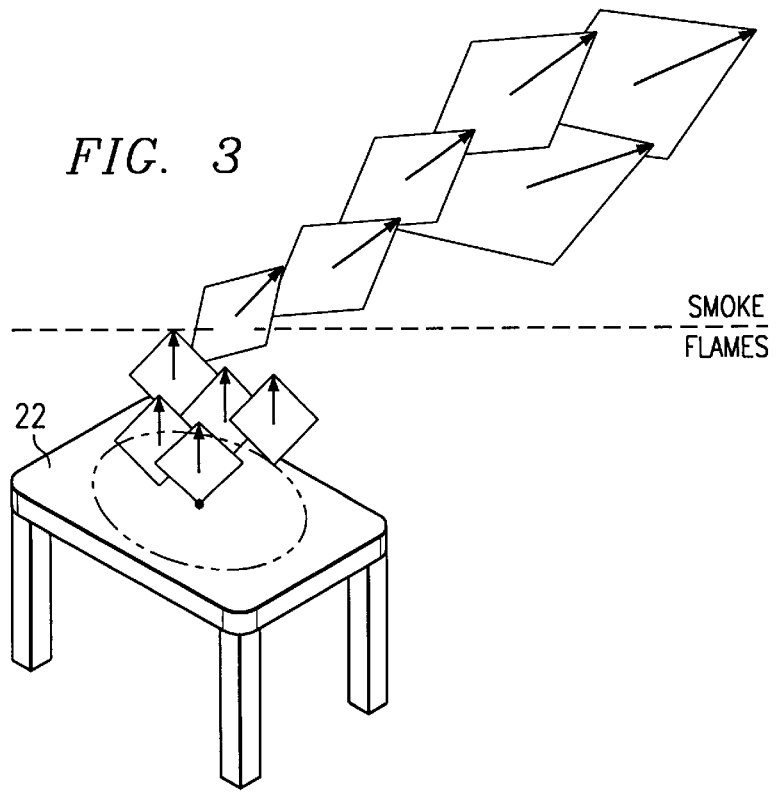
FIG. 3 illustrates particle generation from the computational fire model of FIG. 2, as performed by the particle generator of FIG. 1.

FIG. 3 illustrates a disk representing the table 22 of FIG. 2, on fire, as indicated by the fire database 11a. More specifically, the model has determined that the temperature of the disk has exceeded a certain threshold and therefore combustion has occurred. The disk now has an associated mass consumption rate. The model has also determined the temperature in various zones of the room. The time lapse and mass consumption rate determine how much smoke is in the room.

In the example of FIG. 3, only table 22 is on fire. However, a fire model may accommodate situations where other objects in the room are also on fire. In this case, the disk data is aggregated so that each disk accurately represents its part of the fire.

In response to the fire model, fire particles have been generated by particle generator 102. More specifically, for any disk that is on fire, particles are generated from the data in fire database 11a associated with the disk. A single disk can generate any number of particles. The number of particles and their spacing are determined by the variables associated with the disk. For example, a disk having a certain size and temperature can be expected to have flames and smoke of certain volumes. Thus, in FIG. 3, some particles are flame particles and some are smoke particles.

The particle generator 102 uses the fire database 11a to determine where fire particles are to be located, how many particles are to be generated, their spacing, and to determine which particles are flame and which are smoke.

For location of the particles, the model provides fire location (a location of a disk that is on fire), as well as a radius and height of the fire from any disk. The radius and height data indicates which particles are to be flame particles. Smoke particles are generated and positioned in response to mass consumption rate data.

Similarly, the variables associated with the disk are used to change the particles over time. For example, the top particles of smoke dissipate as new particles of smoke are generated from the flames.

The particles are volumetric in the sense that each has a different (x,y,z) location. Their spacing is typically non-uniform, as determined by the fire model. For example, smoke closer to the flames might be more dense and therefore smoke particles would be more closely spaced there.

Each particle has an associated vector parameter, which provides structure for a graphics primitive to be assigned to the particle. The size of the vector will affect the size of the graphics primitive assigned to the particle. The direction of the vector will determine the particle's location data for each next frame. The vector may be the result of an external condition such as wind.

Transparency values are also determined by the fire model. Two values that affect transparency are the mass rate of consumption and time since inception of the fire. In general, a larger fire (one with an advanced mass consumption) provides more dense smoke. Also, the density of the smoke decreases as it rises in altitude. Thus, a particle at the top of a smoke plume would have a higher transparency value than one near the fire.

Each particle is assigned a graphics primitive. In the example of this description, the graphics primitive assigned to each particle is a rectangular "billboard". The size of the billboard may vary and is determined by the location and vector of the particle. For example, smoke particles may become less dense with height and their billboards become larger. Billboards are rotated so that they are normal to the viewpoint vector, VP. Billboards are used in conjunction with textures and color. Texture and color values are determined by the fire model values. A specific texture and color are assigned to each billboard, as determined by a look-up table or other reference. Texture levels of detail may support viewing resolution as a function of the location of the particles. Thus, particles closer to the viewpoint may have higher detail textures than those that are far away. Thus, the look-up table could be multi-dimensional, with one dimension being a depth value. Fire data values that affect color are the type of material that is burning and the temperature of the fire. Look-up tables may be used to store calculations for different materials, temperatures, and other color factors. As explained below, in other embodiments, graphics primitives other than billboards could be used, with color being assigned as a parameter separate from the billboard.

The parameters associated with a particle, that is, its associated location, vector, transparency, and graphics primitive, are dynamic. In other words, each time a new frame is generated, a particle can be assigned different parameter values.

In the example of this description, different processes are used to generate flame particles, smoke particles in a room, and smoke particles outside a room (emanating from vents such as windows). Appendices B–D are computer code listings that include these three processes, respectively. Each of these processes uses pointers to access fire_data, which is the data in fire database 11a. The disks are the objects data. The processes use this fire data to create, move, or eliminate particles, and to assign parameters to the particles.

Referring to Appendix B, flame particle parameters are described in a typdef structure. Each flame particle has an (x,y,z) position, a height and width of its billboard, a velocity in three dimensional space, a final and a current transparency (opacity) value, and a texture value. In the example of Appendix B, the z values represent height and the y values represent depth. For drawing routines that represent depth in the z dimension, appropriate transformations may be performed.

In Appendix B, the init_flames function provides a texture for the flames, which depends on the fire model. The update_flames routine generates the particles and their parameters, again using fire model data to determine the size of the flames, their color, and other features. Flame particles are first generated at the object, with the height and radius data determining the area to be filled by flame particles at a given time. Flame particles travel from the base of the flame area to the top of the flame area. Flame particles that reach the top of the flame area expire and new particles at the base of the flame area may be generated.

For flame particle generation, transparency changes in response to other parameters, such as the age of the particle and the location of the particle within the fire. For example, when a particle is first created, it is initially transparent and "fades" into view. Particles are less transparent at the base of the flames and become more transparent at the top of the flames. In other words, at the end of a flame particle's lifetime, it fades away.

Appendix B also includes an illumination process, which is the process 104 of FIG. 1. A update_flame_light process uses information about the fire, such as the type of material that is burning, to assign a color to the illumination. The illumination data is delivered to image generator 14 and is used during the display generation to color the walls or other objects in the room. The update_flame_light process positions the light, determines its brightness, and fluctuates the brightness to simulate flickering.

Appendix C describes the generation of smoke particles inside a room. If an object is on fire, smoke is seen emanating from the object toward the ceiling and spreading at the top of the room. The particles may also be vented through windows or other openings. In the fire model of this description, which is a zone-type model, a "hot layer" exists at the top of the room. As the fire progresses, the hot layer increases in size toward the floor of the room. The size of the hot layer determines the location of smoke particles. As described in Appendix C, the smoke particles follow paths toward the ceiling that are at first vertical and then curved. At early stages of the fire, the smoke particles travel to the ceiling before curving at the ceiling. As the fire progresses and the hot layer increases toward the floor, the smoke particles curve sooner.

The fire model data, fire_data, is used during smoke particle generation to determine the number of smoke particles and each particle's parameters. For example, a large fire has more particles. Smoke particle parameters include location, velocity in a vertical path, velocity in the curved path, size of the graphics primitive, and transparency.

Appendix D generates smoke particles for a display of the outside of the room. For such a display, smoke is seen emanating from windows and other vents and rising in the atmosphere. Smoke particles may have paths that are affected by soffits or other obstacles. For example, the smoke particles may follow paths that curve around a soffit.

Thus, as exemplified by FIG. 3 and the accompanying Appendices B–D, particles are generated in response to the fire data provided by the fire model 11. Their parameters are based on both the physical properties of what is burning as well as environmental conditions. The particles, their associated parameters, and the graphics primitive assigned to each particle, provide graphics data elements so that the fire can be visualized.

The data elements associated with the flame and smoke particles form a particle database 105. Particle database 105 is "four-dimensional" in the sense that its data elements represent fire conditions in a three-dimensional volume over time.

Data handler 106 retrieves data elements from database 105 and field-of-view data from an external source such as a user interface or fire simulator system. If the viewpoint is in motion, the field-of-view data is continually updated. In general, data handler 106 performs the operations necessary to prepare the data for drawing. Data handler 106 is scheduled by timing signals to assure periodic image updates. If the image generator 14 is part of a simulator system, the displays are synchronized to the simulator. The general tasks of data handler 106 (culling and sorting of a three-dimensional database of data elements) are similar to those described in U.S. Pat. No. 5,480,305, to Montag, et al., entitled "Weather Simulation System" and assigned to Southwest Research Institute, incorporated by reference herein.

Culling determines what data elements are in the current field-of-view. Each data element is considered to determine whether it is between a near clipping distance and a far clipping distance. Those that are within this range are further considered to determine whether they are within an up-down and left-right range with respect to a two-dimensional image frame. Culling operations may be performed with vector projection techniques, using a viewpoint vector as a reference. If the viewpoint changes, the culling process is updated. If a data element is not in the field-of-view, further processing need not be performed.

Data handler 106 then sorts the data elements in an order that is based on the distance between each data element and the viewpoint. Multiple fire sources are sorted from back to front, as are the particles within each fire.

Figure 4:
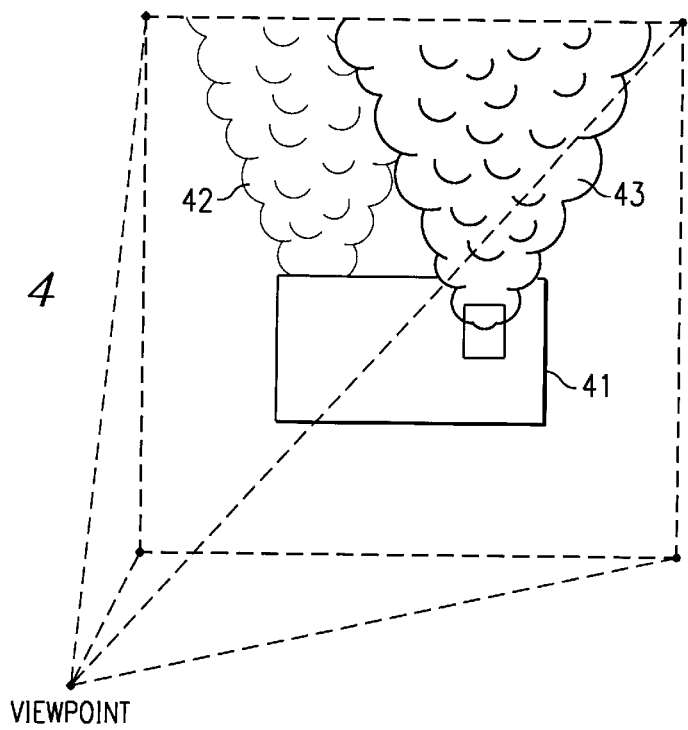
FIG. 4 illustrates the culling and sorting operations of the data handler of FIG. 1.

FIG. 4 illustrates an outside view of a burning room 41, with particles generated from the fire model of FIG. 2. A field of view is determined by a viewpoint, VP, and is outlined with dotted lines. The fire has two smoke plumes 42 and 43. The data elements associated with plumes 42 and 43 are culled so that particles out of the field of view are not drawn. The data elements are then are sorted so that the data elements for the plume in back are drawn before those of the plume in front. Likewise within each plume, the data elements are sorted from back to front. This back-to-front sorting permits proper alpha blending for transparency.

The output of data handler 106 is an list of data elements (each derived from a flame or smoke particle), which is delivered to image generator 14. Each data element has an associated graphics primitive, an (x,y,z) location, RGB color values, and a transparency value. For each new frame, data handler 106 may provide a set of different data elements having different parameters.

In addition to the display list for flame and smoke particles, image generator 14 provides data representing the geometry of the room and its objects. This data is derived from the fire scenario data 13. Other background display information may be provided. As stated above, illumination data for objects in the room that are illuminated by firelight is also provided. Like the smoke and fire particles, the room display data is culled in response to the current viewpoint.

Image generator 14 performs a process generally known as "rasterization" to draw the graphics primitives with pixel values. It includes an alpha blending process, in which new pixel values are calculated from underlying pixel values. Rasterization techniques are described in U.S. Pat. No. 5,480,305, incorporated by reference above. In Appendices B–D, rasterization is included as draw routines.

Figure 5:
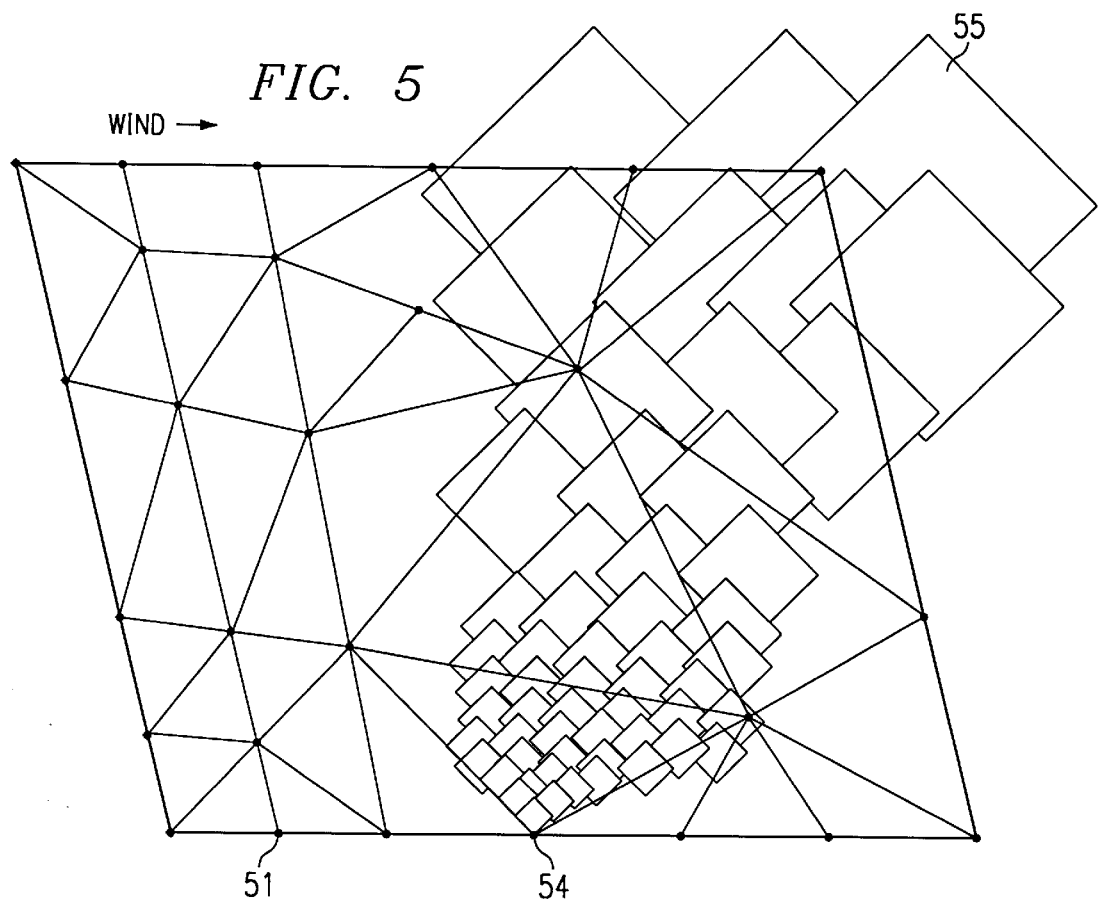
FIG. 5 illustrates another example of a computational fire model and particle generation from the model.

FIG. 5 illustrates another example of a fire model, which is being used to generate particles and their associated data elements in accordance with the invention. In the example of FIG. 5, the fire model is a grid model. Three-dimensional grid points 51 are mapped to an outdoor terrain. A typical grid spacing for such a model might be 30 meters or less. This type of model is typically used to model forest and brush fires.

In the fire model of FIG. 5, each grid point is a computational data element. Each grid point has an x,y,z location and various parameters, such as material and mass consumption rate. The grid points are analogous to the disks of FIG. 2. The output of the fire model of FIG. 5 is the fire database 11a of FIG. 1, which mathematically describes the state of the fire at each point on the grid, for a succession of time slices.

In FIG. 5, the temperature at one of the grid points has exceeded a combustion threshold and a fire has started at that grid point 51. The fire model calculates conduction, convection, and radiation at that point to determine if other points are on fire and the extent of the burning. The model also provides data representing external conditions such as wind. The model calculates how fast the fire grows from grid point to grid point. For any given time slice, the particle generator 102 generates a set of flame particles and a set of smoke particles. As in the example of FIG. 3, the model provides data that determines which particles are flames and which are smoke, as well as the location, spacing, color, and density of each particle. In simple embodiments, only smoke particles and no flame particles could be generated.

As in the example of FIG. 3, for data handling, a graphics data element is associated with each particle. Each data element has a graphics primitive and a transparency value. The graphics primitives are billboards, which each have an associated texture and color. The data handler 106 culls and sorts the data elements so that the image can be rendered in real time.

In the case of either FIG. 3 or FIG. 5, an alternative type of graphics primitive that could be assigned to the particles is a polygon-based primitive known as a "splat". In mathematical terms, a splat is a three-dimensional point spread function about the data element. A resulting two-dimensional splat shape, such as a circle, is assigned to each data element. During image generation, the circle is projected onto the image plane. As the viewpoint vector changes, the circle is rotated so that it remains normal to the viewpoint vector. Each splat may be colored and illuminated according to the parameters of its associated data element. The illumination is determined by the transparency value. A maximum alpha value, typically the same as the transparency value, is set for the center of the splat shape. The edges of the splat have zero alpha values. Each splat has alpha values that vary across it as a Gaussian function, with the largest value in the center and tapering to a zero value at the edges. The splat shape along with its varying alpha function is the "footprint" of the particular splat. For perspective imaging, the footprint for the splat of each data element is scaled by its distance from the viewpoint. Thus, splats that are farther away from the field-of-view origin will appear smaller.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

APPENDIX A

For Mark V, there are 15 variables associated with each room:

ROOM:
- $E_L$ = energy of the layer
- $\dot{E}_L$ = time rate of change of layer energy
- $m_L$ = mass of the layer
- $\dot{m}_L$ = time rate of change of layer mass
- $\dot{E}_{LR}$ = net power gain of layer via radiation
- $\dot{E}_{LD}$ = net power gain of hot layer via convection
- $h_L$ = depth of the layer
- $T_L$ = temperature of the layer
- $y(O_2)$ = mass concentration of oxygen in the layer
- $y(CO)$ = mass concentration of carbon monoxide in the layer
- $y(CO_2)$ = mass concentration of carbon dioxide in the layer
- $y(H_2O)$ = mass concentration of water in the layer
- $y(S)$ = mass concentration of smoke in the layer
- $\Delta p$ = pressure at the center of the floor (relative to ambient)
- $\kappa$ = absorption coefficient of the hot layer Each object in the room involves 14 variables:

OBJECT:
- $m_f$ — mass of the object
- $\dot{m}_f$ — rate of increase of object mass (negative)
- $\dot{E}_f$ — negative of power release by combustion of its fuel vapors
- $T_S$ — surface temperature of object
- $\phi_{LO}$ — radiative flux from the layer
- $\phi_{WO}$ — radiative flux from the walls/ceiling
- $\phi_{FO}$ — radiative flux from all flames
- $h_p$ — height of the lower part of the plume above the object*
- $\dot{m}_p$ — rate of mass transport from the plume into the layer
- $\dot{E}_p$ — rate of energy transport from the plume into the layer
- $\dot{E}_{pr}$ — power loss from the flame by radiation
- $R$ — radius of the base of the flame
- $\tan \psi$ — $2\psi$ is the vertex angle of the cone modeling the flame when the object is flaming.
- $\dot{m}_{au}$ — rate of entrainment of mass from the layer into the upper part of the plume. Taken to be zero in Mark V.

Each vent in a room wall involves 3 variables:

VENT:
- $\dot{m}_u$ = mass (out)flow rate of hot (layer) gases
- $\dot{m}_d$ — mass (out)flow rate of ambient air
- $\dot{E}_u$ = energy outflow rate convected by hot gases Each "wall" of a room involves 2 x 4 = 8 variables:

WALL:
- $T_W$ — surface temperature of the wall
- $\phi_{LW}$ — radiative flux from hot layer to wall
- $\phi_{FW}$ — radiative flux from flames to wall
- $\phi_{LWD}$ — convective heat flux from hot layer to wall Each of these has <u>two</u> values, since the wall has two sides.

```
/*
-- flames.c                                          Copyright 1996
*/                                                   Southwest Research Institute include <Performer/pf.h>
/*
 these are included in longimagedata.h
 #include <gl.h>
 #include <stdlib.h>
*/
#include <math.h>
include <ulocks.h>
#include "longimagedata.h"
#include "fire_interface.h"
include "texture_def.h"
#include "object_graphics.h"
#include "lights.h"

#define MAX_PARTICLES 200
#define MAX_PARTICLE_LIFE 12
#define MIN_PARTICLE_LIFE 7
#define PARTICLE_HALF_WIDTH 0.05
#define PARTICLE_START_DENSITY 40.0
#define START_PARTICLE_FADE 3
define NUM_FIRST_FRAMES 2 typedef struct {
    short frames_remaining;  /* count of remaining lifespan */
    short first_frames;      /* count of frames since "birth" */
    double position_x;
    double position_y;
    double position_z;
    double half_width;
    double height;
    double velocity_x;
    double velocity_y;
    double velocity_z;
    float final_opacity;    /* final or max opacity for THIS particle */
    float opacity;          /* current opacity */
    int flame_tex;
    int txindex;
} particle_type;

Light_data *flame_light;

static particle_type particles[MAX_PARTICLES];
static int number_of_particles;
static fire_interface_type *fire_data;

extern int texture_on;

/* ========================================================================== */ void init_flames()
{
    /*************************************************************/
    usptr_t *fire_data_arena;
    register int i;
    static float envprops[] = {TV_MODULATE, TV_NULL};
    static float txprops[] = {TX_INTERNAL_FORMAT, TX_RGBA_4, TX_NULL};
```

APPENDIX B

```
long iwidth, iheight, num_components;
unsigned long *imageptr, *txtrptr;
/****************************************************************/ fire_data_arena = usinit (FIRE_INTERFACE_ARENA_NAME);
fire_data = usgetinfo (fire_data_arena);
for (i = 0; i < MAX_PARTICLES; i++) {
   particles[i].frames_remaining = 0;
} /* end for loop */
number_of_particles = 0;

/* now initialize flame texture, i.e. read and load textures */ if (texture_on) {
   imageptr = longimagedata ("f1c.rgba", &iwidth, &iheight, &num_components);
   fprintf(stderr, "Loading: f1c.rgba\n");
   txtrptr = (unsigned long *)malloc(iwidth*iheight* sizeof(unsigned long));
   loadtexture (imageptr, txtrptr, num_components, iwidth, iheight);
   texdef2d(FLAME_TEX1, num_components, iwidth, iheight, txtrptr,
      NP(txprops), txprops);
   free(imageptr);
   free(txtrptr);

/* load and define second texture */ imageptr = longimagedata ("f5c.rgba", &iwidth, &iheight, &num_components);
   fprintf(stderr, "Loading: f5c.rgba\n");
   txtrptr = (unsigned long *)malloc(iwidth*iheight* sizeof(unsigned long));
   loadtexture (imageptr, txtrptr, num_components, iwidth, iheight);
   texdef2d(FLAME_TEX2, num_components, iwidth, iheight, txtrptr,
      NP(txprops), txprops);
   free(imageptr);
   free(txtrptr);

/* define flame texture environment--same for both textures */ tevdef(FLAME_TENV, NP(envprops), envprops);

blendfunction (BF_SA, BF_MSA);
} /* end if */

/* now initialize the light model for light from the flames */
flame_light = (Light_data *)pfMalloc(sizeof(Light_data), pfGetSharedArena());
flame_light->lt = pfNewLight(pfGetSharedArena());
flame_light->lm = pfNewLModel(pfGetSharedArena());
flame_light->isnew = 1;
pfEnable (PFEN_LIGHTING);
pfApplyLModel(flame_light->lm);

flame_light->ltamb = 0.1; /* only a temporary initialization */
flame_light->lmamb = 0.0; /* i.e. if no flame, there's no ambient light. */
pfApplyLModel(flame_light->lm);

/* orangish-yellow light from flames */
flame_light->ltcol_r = 192.0 / 256.0;
flame_light->ltcol_g = 88.0 / 256.0;
flame_light->ltcol_b = 16.0 / 256.0;

/* note that the flame light position is specified in update_flame_light */
```

```
} /* end init_flames */ void update_flames ()
{
   /*****************************************************************/
   double Crand = 1.0 / RAND_MAX;
   double Crand2 = 0.5 / RAND_MAX;
   double radius_sq;
   double start_radius;
   double start_radius_sq;
   double rand_x, rand_y;
   double final_height_ratio;
   double fire_height;
   double weight;
   int tselect;
   int new_particles;
   int temp_new;
   int not_in_circle;
   register int i, j, k;

void update_flame_light(void);
   /*****************************************************************/

/* Update the light of the flames */ update_flame_light();

/* Now, update all the existing particles, remove expired particles. */ j = 0;
   for (i = 0; i < number_of_particles; i++) {
      if (particles[i].frames_remaining > 0) {
         particles[j].position_x = particles[i].position_x;
         particles[j].position_y = particles[i].position_y;
         particles[j].position_z = particles[i].position_z;
         particles[j].half_width = particles[i].half_width;

particles[j].height = particles[i].velocity_z + particles[i].height;
         particles[j].velocity_x = particles[i].velocity_x;
         particles[j].velocity_y = particles[i].velocity_y;
         particles[j].velocity_z = particles[i].velocity_z;
         particles[j].flame_tex = particles[i].flame_tex;
         particles[j].txindex = particles[i].txindex;
         particles[j].frames_remaining = particles[i].frames_remaining - 1;
         particles[j].first_frames = particles[i].first_frames + 1;
         particles[j].final_opacity = particles[i].final_opacity;

if (particles[j].first_frames < NUM_FIRST_FRAMES) {
            /* fade-on particle */
            particles[j].opacity = particles[j].final_opacity *
               ((float)particles[j].first_frames / NUM_FIRST_FRAMES);
         } else if (particles[j].frames_remaining < START_PARTICLE_FADE) {
            /* fade off particle */
            particles[j].opacity = particles[i].opacity * 0.50;
         } else {
            /* no change in opacity */
            particles[j].opacity = particles[i].final_opacity;
         } j++;
```

```
        } /* end if */
    } /* end for loop */
    number_of_particles = j;

/* Add new particles. */ for (j = 0; j < fire_data->number_of_objects; j++) {
        if (fire_data->objects[j].burning) { radius_sq = fire_data->objects[j].fire_radius *
                fire_data->objects[j].fire_radius;

temp_new = ceil (3.1415927 * radius_sq * PARTICLE_START_DENSITY);
            new_particles = min(temp_new, 5);

if (new_particles + number_of_particles > MAX_PARTICLES) {
                new_particles = MAX_PARTICLES - number_of_particles;
            } /* end if */ if (fire_data->objects[j].fire_radius < 2.0 * PARTICLE_HALF_WIDTH) {
                start_radius = 0.5 * fire_data->objects[j].fire_radius;
            } else {
                start_radius = fire_data->objects[j].fire_radius -
                    PARTICLE_HALF_WIDTH;
            } /* end if */ fire_height = fire_data->objects[j].fire_height;
            start_radius_sq = start_radius * start_radius;

for (k = 0; k < new_particles; k++) {
                i = number_of_particles + k;
                particles[i].frames_remaining =
                    (rand () % (MAX_PARTICLE_LIFE - MIN_PARTICLE_LIFE))
                    + MIN_PARTICLE_LIFE;
                particles[i].first_frames = 1;
                not_in_circle = 1;
                while (not_in_circle) {
                    rand_x = 2.0 * start_radius * (rand () * Crand - 0.5);
                    rand_y = 2.0 * start_radius * (rand () * Crand - 0.5);
                    if ((rand_x * rand_x + rand_y * rand_y) < start_radius_sq) {
                        not_in_circle = 0;
                    } /* end if */
                } /* end while */
                particles[i].position_x = fire_data->objects[j].position_x + rand_x;
                particles[i].position_y = fire_data->objects[j].position_y + rand_y;
                particles[i].position_z = get_current_top(j);
                particles[i].half_width =
                    max(PARTICLE_HALF_WIDTH, 0.3*fire_data->objects[j].fire_radius);
                particles[i].height = 0.20 * fire_height;

/* final height calculation: particles grow in the range of
                    .2 to 1.0 of the difference between initial height and flame
                    height, weighted so that particles nearer the center grow
                    higher. */ weight = 1.0 -
                    ((rand_x * rand_x + rand_y * rand_y) / start_radius_sq);
                if (weight < 0.2) weight = 0.2;
                particles[i].velocity_z = weight * (fire_height -
                    particles[i].height) / (particles[i].frames_remaining + 1);
```

```
            particles[i].opacity = 1.0;
            particles[i].final_opacity = 0.95;
            particles[i].opacity = particles[i].final_opacity *
                ((float)particles[i].first_frames / NUM_FIRST_FRAMES);

/* now we pick another random number to select the flame texture
           and texture coordinate mapping for this particle. */
        tselect = floor(rand() * Crand * 4.0); /* range of 0 to 3 */
        switch (tselect)
        {
            case 0:
                particles[i].flame_tex = FLAME_TEX1;
                particles[i].txindex = 0;
                break;
            case 1:
                particles[i].flame_tex = FLAME_TEX1;
                particles[i].txindex = 1;
                break;
            case 2:
                particles[i].flame_tex = FLAME_TEX2;
                particles[i].txindex = 0;
                break;
            case 3:
                particles[i].flame_tex = FLAME_TEX2;
                particles[i].txindex = 1;
                break;
        } /* end switch */

} /* end for loop */
        number_of_particles += new_particles;
    } /* end if */
    } /* end for loop */
} /* end update_flames */

/*
-- update_flame_light
--
-- This function positions the light model for the light at the location
-- of the largest fire in the room and determines
-- the brightness (ambient) of the light.  The brightness fluctuates to
-- simulate the flickering flames.  The base brightness is proportional to the
-- fire radius of the largest fire so that small fires produce less light
-- than big fires.
--
*/
void update_flame_light()
{
    /*****************************************************/
    register int j;
    static int flame_object;
    static int first_time = 1;
    static int frames_this_period = 0;
    double temp_radius;
    float Crand = 1.0 / RAND_MAX;
    float new_ambient;
    static float base_ambient;
    static float current_ambient;
    static float delta_ambient;
```

```
static float fluctuatic_;
/******************************************************/ if (fire_data->number_of_objects < 1) {
   flame_light->on = 0;
   return;
} else {
   flame_light->on = 0;
   temp_radius = 0.0;

/* determine whether or not there are any fires and find the largest
      fire radius of all burning objects. */ for (j = 0; j < fire_data->number_of_objects; j++) {
      if (fire_data->objects[j].burning) {
         flame_light->on = 1;
         /* now find the object with the largest fire */
         if (fire_data->objects[j].fire_radius > temp_radius) {
            flame_object = j;
            temp_radius = fire_data->objects[j].fire_radius;
         }
      } /* end if */
   } /* end for */
} /* end if */ if (! flame_light->on) {
   return;
} else {
   /* position the light at the largest fire */
   flame_light->px = fire_data->objects[flame_object].position_x;
   flame_light->py = fire_data->objects[flame_object].position_y;
   flame_light->pz = get_current_top(flame_object) +
      fire_data->objects[flame_object].fire_height;
} if (frames_this_period == 0) {
   /* compute new fluctuation and period */
   /* base ambient is proportional to fire radius, clamped to a max
      value. A zero radius fire has 0 ambient. A fire of radius
      2.0 meters or greater has a base ambient of 0.4. */
   base_ambient =
      0.20 * min(fire_data->objects[flame_object].fire_radius, 2.0);
   if (first_time) {
      current_ambient = base_ambient;
      fluctuation = 0.40;
      first_time = 0;
   }
   new_ambient = base_ambient + (rand() * Crand) * fluctuation;
   if (new_ambient > 1.0) new_ambient = 1.0;
   frames_this_period = ceil((rand() * Crand) * 6.0);
   delta_ambient = (new_ambient - current_ambient) /
      (float)frames_this_period;
} /* end if */ current_ambient += delta_ambient;
flame_light->ltamb = current_ambient;
flame_light->isnew = 1;
frames_this_period--;
return;
```

} /* end update_flame_ligh. */
/* ================================================================== */
void draw_flames (pfChannel *chan)
{
    /*******************************************************************/
    double Crand = 1.0 / RAND_MAX;
    pfVec3 xyz, hpr;
    float sh, ch;
    float pos[3];
    float color_alpha[4] = {1.0, 1.0, 1.0, 1.0};
    register int i, ti;
    static float txcoord[][2] = {{0.0, 0.0}, {1.0, 0.0}, {1.0, 1.0}, {0.0, 1.0}};
    static int txindex[][4] = {{1,2,3,0}, {0,3,2,1}}; /* mirror images */
    /*******************************************************************/

/* Get the orientation and position of the current viewpoint. */ pfGetChanView (chan, xyz, hpr);
    pfSinCos (hpr[0], &sh, &ch);

/* Draw the rectangle for each polygon. */ lmbind (MATERIAL, 0);

if (texture_on) {
        tevbind(TV_ENV0, FLAME_TENV);
    } for (i = 0; i < number_of_particles; i++) {
        if (texture_on) {
            texbind(TX_TEXTURE_0, particles[i].flame_tex);
        }
        color_alpha[3] = particles[i].opacity;
        c4f (color_alpha);
        ti = particles[i].txindex;
        bgnpolygon ();
        pos[0] = particles[i].position_x + ch * particles[i].half_width;
        pos[1] = particles[i].position_y + sh * particles[i].half_width;
        pos[2] = particles[i].position_z;
        t2f (txcoord[txindex[ti][0]]);
        v3f (pos);
        pos[2] += particles[i].height;
        t2f (txcoord[txindex[ti][1]]);
        v3f (pos);
        pos[0] -= 2.0 * ch * particles[i].half_width;
        pos[1] -= 2.0 * sh * particles[i].half_width;
        t2f (txcoord[txindex[ti][2]]);
        v3f (pos);
        pos[2] -= particles[i].height;
        t2f (txcoord[txindex[ti][3]]);
        v3f (pos);
        endpolygon ();
    } /* end for loop */

/* turn off texture if it was on */
    if (texture_on) {
        texbind(TX_TEXTURE_0, 0);
        tevbind(TV_ENV0, 0);
```

```
  }
} /* end draw_flames */
/* ======================================================================== */
```

```
                                                          Copyright 1996
/*                                                        Southwest Research Institute
-- smoke_room.c
-- Contains functions for updating smoke within the room.
*/ include <Performer/pf.h>
include <gl.h>
include <stdlib.h>
include <math.h>
include <ulocks.h>
include "fire_interface.h"
include "texture_def.h"
include "vent_def.h"
include "object_graphics.h"
include "env.h"
include "lights.h"

/* Diagram of smoke path--points P0, P1 and P2 shown:

* P2         |
              *              |
            *                C1 distance
          * P1               |
         *                   |
        *
       *
      * P0
*/ define MAX_PARTICLES 1000
define MAX_PARTICLE_LIFE 500
define MIN_PARTICLE_LIFE 100
define NUM_FIRST_FRAMES 3
define INIT_OPACITY 0.3
define FINAL_OPACITY 0.9
define PARTICLE_START_DENSITY 10.0 define INIT_VELOCITY 1.7   /* meters per second */
define DIST_SQ 0.16        /* DIST squared, where DIST is the XY plane
                               distance (meters) from point P1 to P2
                               in the smoke particle curved path */
define C1 1.0              /* distance (meters) from hot layer at which smoke
                               begins to fan out */ define TRANSITION 0.30
define HALF_TRANSITION 0.15
define HALF_WIDTH_GROWTH_RATE 1.05   /* i.e. percentage growth per frame */
define ABSORB_COEFF 0.8    /* smoke light absorption coefficienta guess */ typedef struct {
  short alive;
  short first_frames;
  double position_x;  /* current particle xyz position */
  double position_y;
  double position_z;
  double vel_x;       /* current particle velocity in X,Y and Z directions */
  double vel_y;
  double vel_z;
  double p2_vel_x;    /* X,Y,Z velocity at point P2 in the curved path */
```

APPENDIX C

```
   double p2_vel_y;
   double p2_vel_z;
   double half_width;
   double height;
   float opacity;
   int txindex;        /* texture index */
} particle_type;

float temp_sun_ltamb;

static particle_type particles[MAX_PARTICLES];  /* room particles */
static int number_room_particles;
static int hot_layer_visible = 0;
static float first_frames_increment;
static double max_room_half_width;
static fire_interface_type *fire_data;

extern int texture_on;
extern vent_poly_vertices vent_polys[];
extern int outside_room;
extern float Tod;
extern Light_data *flame_light;
/* ================================================================ */
/*
-- init_room_smoke
--
-- Initializes room smoke data.
--
*/
void init_room_smoke()
{
   /****************************************************/
   register int i;
   usptr_t *fire_data_arena;
   double room_half_width_x, room_half_width_y;
   /****************************************************/ fire_data_arena = usinit (FIRE_INTERFACE_ARENA_NAME);
   fire_data = usgetinfo (fire_data_arena);
   for (i = 0; i < MAX_PARTICLES; i++) {
      particles[i].alive = 0;
   } /* end for loop */ number_room_particles = 0;
   first_frames_increment =
      (FINAL_OPACITY - INIT_OPACITY) / (float) NUM_FIRST_FRAMES;
   room_half_width_x = fire_data->room_width_x / 2.0;
   room_half_width_y = fire_data->room_width_y / 2.0;
   max_room_half_width = min(room_half_width_x, room_half_width_y);

} /* end init_room_smoke */

/*
-- update_room_particles
--
-- Updates the room smoke particles, i.e. the fire plume and hot layer
-- smoke particles.
```

```
*/
void update_room_particles(pfChannel *chan)
{
   /***********************************************************/
   double Crand = 1.0 / RAND_MAX;
   double delta_x, delta_y, p2_x, p2_y;
   double dest_x, dest_y;
   double particle_heading;
   double radius;
   double radius_sq;
   double rvalue;
   double rand_x, rand_y;
   double xdiff, ydiff;
   double zfrac;
   double point1_z;       /* height at which smoke particles begin to fanout */
   double cldist;
   double p1_to_p2_dist_sq;
   int new_particles;
   register int i, j, k;
   register int not_in_circle, in_circle;
   static int next_index = 0;

void update_visibility(pfChannel *chan);
   void keep_in_room(int j);
   /***********************************************************/

/* Update the visibility based on eyepoint's position w.r.t. hot layer */ update_visibility(chan);

/* Update all the existing particles, remove expired particles. */ j = 0;
   for (i = 0; i < number_room_particles; i++) {
      if (particles[i].alive) {
         cldist = max(C1, 2.0 * particles[i].height);
         if (particles[i].position_z < fire_data->hot_layer_height - cldist) {
            /* particle moves straight up */
            particles[j].position_x = particles[i].position_x;
            particles[j].position_y = particles[i].position_y;
            particles[j].position_z = particles[i].position_z +
               particles[i].vel_z * SECONDS_PER_FRAME;

/* copy or set remaining terms */
            particles[j].vel_x = particles[i].vel_x;
            particles[j].vel_y = particles[i].vel_y;
            particles[j].vel_z = particles[i].vel_z;
            particles[j].p2_vel_x = particles[i].p2_vel_x;
            particles[j].p2_vel_y = particles[i].p2_vel_y;
            particles[j].p2_vel_z = particles[i].p2_vel_z;
            particles[j].half_width = particles[i].half_width;
            particles[j].height = particles[i].height;
            particles[j].alive = 1;
            particles[j].first_frames = particles[i].first_frames - 1;

/* fade-on the smoke particles so we don't see them "pop" on */
            if (particles[j].first_frames > 0) {
               particles[j].opacity =
                  particles[i].opacity + first_frames_increment;
```

```
            } else {
                particles[j].opacity = FINAL_OPACITY;
            }

} else if (particles[i].vel_z > (0.10 * INIT_VELOCITY)) {
/*
            && (particles[i].position_z <
                    fire_data->hot_layer_height - particles[i].height)) {
*/

/* curved part of particle path--velocities change */ point1_z = fire_data->hot_layer_height - cldist;
            zfrac = (particles[i].position_z - point1_z) / cldist;
            if (zfrac > 1.0) zfrac = 1.0;

/* Linearly interpolate velocities to create a curved path.
               NOTE: SINCE THERE ARE ZERO MULTIPLIERS AT THIS POINT,
               I'VE SIMPLIFIED THE EQUATIONS.*/ particles[j].vel_x = zfrac * particles[i].p2_vel_x;
            particles[j].vel_y = zfrac * particles[i].p2_vel_y;
            particles[j].vel_z = (1.0 - zfrac) * INIT_VELOCITY;
            particles[j].position_x = particles[i].position_x +
                particles[j].vel_x * SECONDS_PER_FRAME;
            particles[j].position_y = particles[i].position_y +
                particles[j].vel_y * SECONDS_PER_FRAME;
            particles[j].position_z = particles[i].position_z +
                particles[j].vel_z * SECONDS_PER_FRAME;

/* expand and fade particles as they fan out */
            particles[j].half_width = particles[i].half_width *
                HALF_WIDTH_GROWTH_RATE;
            particles[j].opacity = (1.0 - zfrac) * FINAL_OPACITY;
            particles[j].height = particles[i].height;

/* copy remaining terms */
            particles[j].p2_vel_x = particles[i].p2_vel_x;
            particles[j].p2_vel_y = particles[i].p2_vel_y;
            particles[j].p2_vel_z = particles[i].p2_vel_z;
            particles[j].alive = 1;

/* make sure particle will not extend beyond the room */
            keep_in_room(j);

} else {
            hot_layer_visible = 1;

/* last frame of this particle's life, then it expires */
            point1_z = fire_data->hot_layer_height - cldist;
            zfrac = (particles[i].position_z - point1_z) / cldist;
            particles[j].vel_x = zfrac * particles[i].p2_vel_x;
            particles[j].vel_y = zfrac * particles[i].p2_vel_y;
            particles[j].vel_z = (1.0 - zfrac) * INIT_VELOCITY;
            particles[j].position_x = particles[i].position_x +
                particles[j].vel_x * SECONDS_PER_FRAME;
            particles[j].position_y = particles[i].position_y +
                particles[j].vel_y * SECONDS_PER_FRAME;
            particles[j].position_z = particles[i].position_z +
                particles[j].vel_z * SECONDS_PER_FRAME;
```

```
            particles[j].half_width = particles[i].half_width *
                HALF_WIDTH_GROWTH_RATE;
            particles[j].height = particles[i].height;
            particles[j].opacity = (1.0 - zfrac) * FINAL_OPACITY;
            particles[j].alive = 0;

/* make sure particle will not extend beyond the room */
            keep_in_room(j);

} /* end if */ particles[j].txindex = particles[i].txindex;

j++;
    } /* end if */
} /* end for loop */
number_room_particles = j;

/* Add new particles. */
for (j = 0; j < fire_data->number_of_objects; j++) {
    if (fire_data->objects[j].burning) {
        radius = fire_data->objects[j].fire_radius;
        radius_sq = radius * radius;

if (radius < 0.1)          /* as particles get bigger we need fewer */
            new_particles = 3;
        else if (radius < 0.2)
            new_particles = 2;
        else
            new_particles = 1;

if (new_particles + number_room_particles > MAX_PARTICLES) {
            new_particles = MAX_PARTICLES - number_room_particles;
        } /* end if */ for (k = 0; k < new_particles; k++) {
            i = number_room_particles + k;
            particles[i].alive = 1;
            particles[i].first_frames = NUM_FIRST_FRAMES;
            particles[i].opacity = INIT_OPACITY;
            particles[i].vel_x = 0.0;
            particles[i].vel_y = 0.0;
            particles[i].vel_z = INIT_VELOCITY;   /* meters per second */
            particles[i].half_width = max(0.06, radius);
            particles[i].height = 2.0 * particles[i].half_width;
            particles[i].txindex = next_index;

if (next_index == 0)
                next_index = 1;
            else
                next_index = 0;

/* compute initial position of smoke particle within radius
               of the fire.  In fact, we keep it within .8 of the radius
               to make sure particles don't extend too far beyond fire
               initially. */
            not_in_circle = 1;
            rvalue = 2.0 * (0.8 * radius);
            while (not_in_circle) {
```

```
                rand_x = rv__ue * (rand () * Crand - 0. );
                rand_y = rvalue * (rand () * Crand - 0.5);
                if ((rand_x * rand_x + rand_y * rand_y) < radius_sq) {
                    not_in_circle = 0;
                } /* end if */
            } /* end while */
            particles[i].position_x = fire_data->objects[j].position_x + rand_x;
            particles[i].position_y = fire_data->objects[j].position_y + rand_y;
            particles[i].position_z = get_current_top(j);

/* compute final position of smoke particle within the room but
               not within the plume fanout radius, i.e. within DIST distance
               of inital position, otherwise the math blows up.  If the
               fire diameter is greater than DIST, use the fire diameter
               instead. */ p1_to_p2_dist_sq = max(DIST_SQ, 4.0 * radius_sq);
            in_circle = 1;
            while (in_circle) {
                dest_x = fire_data->room_width_x * (rand () * Crand);
                dest_y = fire_data->room_width_y * (rand () * Crand);
                xdiff = dest_x - particles[i].position_x;
                ydiff = dest_y - particles[i].position_y;
                if ((xdiff * xdiff + ydiff * ydiff) > p1_to_p2_dist_sq) {
                    in_circle = 0;
                } /* end if */
            } /* end while */

/* determine the velocity at point P2 */

/* compute deltax,y from P1 to destination to get heading */
            delta_x = dest_x - particles[i].position_x;
            delta_y = dest_y - particles[i].position_y;
            particle_heading = atan2(delta_y, delta_x);

/* compute velocities at point p2 */
            particles[i].p2_vel_x = 0.5 * INIT_VELOCITY * cos(particle_heading);
            particles[i].p2_vel_y = 0.5 * INIT_VELOCITY * sin(particle_heading);
            particles[i].p2_vel_z = 0.0;

} /* end for each new particle loop */ number_room_particles += new_particles;
    } /* end if */
} /* end for each object loop */

} /* end update_room_particles */

/*
-- keep_in_room
--
-- keep_in_room makes sure the smoke plume particle stays within the
-- X and Y limits of the room.  It might try to extend beyond due to
-- growth and fanout.  The Z limit is not checked because the velocity
-- calculations should ensure that it does not go above the ceiling.
--
*/
void keep_in_room(int p)
{
    /*************************************************************/
```

```
    double half_width;
/****************************************************************/ if (particles[p].half_width > max_room_half_width)
        particles[p].half_width = max_room_half_width;

half_width = particles[p].half_width;

if (particles[p].position_x - half_width < 0.0)
        particles[p].position_x = half_width;
    if (particles[p].position_x + half_width > fire_data->room_width_x)
        particles[p].position_x = fire_data->room_width_x - half_width;

if (particles[p].position_y - half_width < 0.0)
        particles[p].position_y = half_width;
    if (particles[p].position_y + half_width > fire_data->room_width_y)
        particles[p].position_y = fire_data->room_width_y - half_width;

} /* end keep_in_room */

/* update hot_layer_vis */
void update_visibility(pfChannel *chan)
{
/****************************************************************/
    static float bottom_vis = 4.0;
/*
    static float hot_layer_vis = 1.0;
*/
    static float hot_layer_vis = 5.0;
    double fraction;
    double transition_bottom, transition_top;
    float vis_diff, transition_vis;
    pfVec3 xyz, hpr;
/****************************************************************/ pfGetChanView (chan, xyz, hpr);

/* if eyepoint is outside of room or below hot layer transition, set vis
       to default. Otherwise, compute current visibility.  The transition
       region is split on either side of the hot layer polygon */ transition_bottom = fire_data->hot_layer_height - HALF_TRANSITION;
    transition_top = fire_data->hot_layer_height + HALF_TRANSITION;

if (xyz[2] < transition_bottom || outside_room) {
        ResetFog();
    } else {
        /* compute current visibility */ bottom_vis = 3.0 * hot_layer_vis;

if (xyz[2] > transition_bottom && xyz[2] < transition_top) {
            /* in visibility transition */
            fraction = (xyz[2] - transition_bottom) / TRANSITION;
            vis_diff = bottom_vis - hot_layer_vis;
            transition_vis = bottom_vis - fraction * vis_diff;
            ChangeFog(0.0, transition_vis, 0.1, 0.1, 0.1);
        } else {
            /* fully in hot layer */
            ChangeFog(0.0, hot_layer_vis, 0.1, 0.1, 0.1);
```

```
      } /* end if */
   } /* end if */
} /* end update_visibility */
/* ================================================================== */
/*
-- draw_hl_at_vents
--
-- Draws the hot layer polygons at the vents.
-- Drawing of these polygons is separated from draw_hl_in_room because
-- these polygons should not receive illumination from the fire, while the
-- hot layer in-room polygon should.
*/
void draw_hl_at_vents()
{
   /*******************************************************************/
   static float color_alpha[] = {0.2, 0.2, 0.2, 0.0};
   static float txcoord2[][2] =
      {{0.4, 0.65}, {0.65, 0.65}, {0.65, 0.35}, {0.4, 0.35}};
   static float txcoord3[][2] =
      {{0.4, 0.95}, {0.65, 0.95}, {0.65, 0.65}, {0.4, 0.65}};
   float pos[3];
   float zsize;
   register int v;
   fire_interface_vent_type *vent;
   /*******************************************************************/ if (! hot_layer_visible) {
      return;
   } else if (color_alpha[3] < 1.0) {
      color_alpha[3] += 0.04;
   } else {
      color_alpha[3] = 1.0;
   } lmbind (MATERIAL, 0);

if (!texture_on) {
      texbind(TX_TEXTURE_0, 0);
      tevbind(TV_ENV0, 0);
   } color_alpha[0] = 0.2 * Tod;
   color_alpha[1] = 0.2 * Tod;
   color_alpha[2] = 0.2 * Tod;

c4f (color_alpha);

/* now draw the polygons for the hot layer where it intersects the vent. */
   /* These polygons fill in the area of the vent covered by the hot layer
      plus we add a small extension polygon below the hot layer height
      that provides a nice non-straight, textured edge. */ for (v = 0; v < fire_data->number_of_vents; v++) {
      vent = &(fire_data->vents[v]);

if (vent->open && (fire_data->hot_layer_height < vent->top_height)) {
```

```
        zsize = vent->top_height - fire_data->hot_layer_height;

/* draw polygon facing out at inner wall */
        if (texture_on) {
            texbind(TX_TEXTURE_0, SMOKE_TEX2);
            tevbind(TV_ENV0, SMOKE_TENV);
        } bgnpolygon ();
        pos[0] = vent_polys[v].inside3[0];
        pos[1] = vent_polys[v].inside3[1];
        pos[2] = fire_data->hot_layer_height;
        t2f (txcoord2[0]);
        v3f (pos);
        pos[0] = vent_polys[v].inside4[0];
        pos[1] = vent_polys[v].inside4[1];
        t2f (txcoord2[1]);
        v3f (pos);
        t2f (txcoord2[2]);
        v3f (vent_polys[v].inside4);
        t2f (txcoord2[3]);
        v3f (vent_polys[v].inside3);
        endpolygon ();

/* draw small extension polygon */
        zwritemask(0);   /* disable writing to z-buffer */
        if (texture_on) {
            texbind(TX_TEXTURE_0, SMOKE_TEX1);
        }
        bgnpolygon ();
        pos[0] = vent_polys[v].inside3[0];
        pos[1] = vent_polys[v].inside3[1];
        pos[2] = fire_data->hot_layer_height - (0.2 * zsize);
        t2f (txcoord3[0]);
        v3f (pos);
        pos[0] = vent_polys[v].inside4[0];
        pos[1] = vent_polys[v].inside4[1];
        t2f (txcoord3[1]);
        v3f (pos);
        pos[2] = fire_data->hot_layer_height;
        t2f (txcoord3[2]);
        v3f (pos);
        pos[0] = vent_polys[v].inside3[0];
        pos[1] = vent_polys[v].inside3[1];
        t2f (txcoord3[3]);
        v3f (pos);
        endpolygon ();
        zwritemask(0xFFFFFFFF); /* enable writing to z-buffer */
    } /* end if */
} /* end for */

/* turn "off" texture if it was on */
if (texture_on) {
    texbind(TX_TEXTURE_0, 0);
    tevbind(TV_ENV0, 0);
}

} /* end draw_hl_at_vents */
/*
```

```
-- draw_hl_in_room
--
-- Draws only the hot layer polygon (horizontal polygon) inside the room.
-- Drawing of this polygons is separated from draw_hl_at_vents because
-- this polygon should receive illumination from the fire, while the
-- hot layer vent polygons should not.
*/
void draw_hl_in_room()
{
    /******************************************************************/
    float max_light;
    static float color_alpha[] = {0.2, 0.2, 0.2, 0.0};
    static float txcoord[][2] = {{0.0, 0.0}, {1.0, 0.0}, {1.0, 1.0}, {0.0, 1.0}};
    float pos[3];
    /******************************************************************/ if (! hot_layer_visible) {
        return;
    } else if (color_alpha[3] < 1.0) {
        color_alpha[3] += 0.04;
    } else {
        color_alpha[3] = 1.0;
    } lmbind (MATERIAL, 0);

if (texture_on) {
        texbind(TX_TEXTURE_0, SMOKE_TEX2); /* texture for smoke layer poly */
        tevbind(TV_ENV0, SMOKE_TENV);
    } else {
        texbind(TX_TEXTURE_0, 0);
        tevbind(TV_ENV0, 0);
    }

/* yes, max_light is a kludge */ max_light = (temp_sun_ltamb + flame_light->ltamb) * 3.0;
    max_light = min(max_light, 1.0);

color_alpha[0] = 0.2 * max_light;
    color_alpha[1] = 0.2 * max_light;
    color_alpha[2] = 0.2 * max_light;
    c4f (color_alpha);

/* draw hot layer smoke base polygon */ bgnpolygon ();
    pos[0] = 0.0; pos[1] = 0.0; pos[2] = fire_data->hot_layer_height;
    t2f (txcoord[1]);
    v3f (pos);
    pos[1] += fire_data->room_width_y;
    t2f (txcoord[2]);
    v3f (pos);
    pos[0] += fire_data->room_width_x;
    t2f (txcoord[3]);
    v3f (pos);
    pos[1] -= fire_data->room_width_y;
    t2f (txcoord[0]);
    v3f (pos);
    endpolygon ();
```

```c
    /* turn "off" texture if it was on */
    if (texture_on) {
        texbind(TX_TEXTURE_0, 0);
        tevbind(TV_ENV0, 0);
    }

} /* end draw_hl_in_room */ void draw_room_smoke (pfChannel *chan)
{
    /******************************************************************/
    pfVec3 xyz, hpr;
    float sh, ch;
    float pos[3];
    float max_light;
    static float color_alpha[] = {0.2, 0.2, 0.2, 1.0};
    register int i;
    register int ti;
    static float txcoord[][2] = {{0.0, 0.0}, {1.0, 0.0}, {1.0, 1.0}, {0.0, 1.0}};
    static int txindex[][4] = {{1,2,3,0}, {0,3,2,1}}; /* mirror images */
    /******************************************************************/

/* Get the orientation and position of the current viewpoint. */ pfGetChanView (chan, xyz, hpr);
    pfSinCos (hpr[0], &sh, &ch);

lmbind (MATERIAL, 0);

if (texture_on) {
        texbind(TX_TEXTURE_0, SMOKE_TEX1); /* texture for smoke particles */
        tevbind(TV_ENV0, SMOKE_TENV);
    } else {
        texbind(TX_TEXTURE_0, 0);
        tevbind(TV_ENV0, 0);
    }

/* yes, max_light is a complete kludge, but it doesn't really matter. */ max_light = (temp_sun_ltamb + flame_light->ltamb) * 3.0;
    max_light = min(max_light, 1.0);

color_alpha[0] = 0.2 * max_light;
    color_alpha[1] = 0.2 * max_light;
    color_alpha[2] = 0.2 * max_light;

for (i = 0; i < number_room_particles; i++) { color_alpha[3] = particles[i].opacity;
        c4f (color_alpha);

ti = particles[i].txindex;
        bgnpolygon ();
        pos[0] = particles[i].position_x + ch * particles[i].half_width;
        pos[1] = particles[i].position_y + sh * particles[i].half_width;
        pos[2] = particles[i].position_z;
        t2f (txcoord[txindex[ti][0]]);
        v3f (pos);
        pos[2] += particles[i].height;
```

```
        t2f (txcoord[txindex[ti][1]]);
        v3f (pos);
        pos[0] -= 2.0 * ch * particles[i].half_width;
        pos[1] -= 2.0 * sh * particles[i].half_width;
        t2f (txcoord[txindex[ti][2]]);
        v3f (pos);
        pos[2] -= particles[i].height;
        t2f (txcoord[txindex[ti][3]]);
        v3f (pos);
        endpolygon ();
    } /* end for loop */

/* turn "off" texture if it was on */
    if (texture_on) {
        texbind(TX_TEXTURE_0, 0);
        tevbind(TV_ENV0, 0);
    }

} /* end draw_room_smoke */

/* ========================================================================= */
```

```
                                                  Copyright 1996
/*                                                Southwest Research Institute
-- smoke_vent.c
-- Contains functions for updating vent smoke particles.
*/ include <Performer/pf.h>
include <gl.h>
include <stdlib.h>
include <math.h>
include <ulocks.h>
include "fire_interface.h"
include "texture_def.h"

define HALF_WIDTH_GROWTH_RATE 0.10  /* meters per second */
define INIT_VPART_VELOCITY 1.8      /* initial Z velocity, meters per second*/
define MAX_NEW 3                    /* max number of new particles per frame*/
define MAX_OPACITY 0.9              /* maximum particle opacity */
define MAX_PARTICLES_PER_VENT 700
define MAX_VPARTICLE_LIFE   300
define MIN_VPARTICLE_LIFE   270
define NFRAMES 3                    /* number frames between new particles */
define NPRATE 0.01          /* new vent particle rate proportion to outflow */
define NUM_FIRST_FRAMES 4           /* number of frames for fade-on */
define START_VPARTICLE_FADE 60      /* number of frames for fade-off */
define VPARTICLE_HEIGHT 0.30        /* default particle height */
define VPARTICLE_HALF_WIDTH 0.15    /* default particle half-width */
define XYVELOCITY 0.3               /* initial XY-plane velocity, m/sec */

/* Vent particle initial velocity increases 1m/s per DELTAK Kelvin
   temperature of hot layer above cold layer temperature.  For example, a
   HL temp of 340 results in an initial velocity of:
   INIT_VPART_VELOCITY + ((340 - cold_layer_temp) / DELTAK)
   This is not physically based, but attempts to relate vent particle
   velocity to hot layer temperature. */
define DELTAK 40.0 define X 0
define Y 1 typedef struct {
    float age;         /* age of the particle in seconds. (currently unused) */
    float opacity;          /* current particle opacity */
    float final_opacity;    /* final or max opacity for THIS particle */
    short frames_remaining; /* remaining life span in frames */
    short first_frames;     /* count of frames since "birth" */
    float position_x;
    float position_y;
    float position_z;
    float half_width;
    float height;
    float delta_x;          /* per frame change in x,y while in vent plume */
    float delta_y;
    float velocity;         /* current velocity (upward) in meters per second */
    float ivelocity;        /* initial velocity (upward) */
    float inv_max_alt;      /* inverse max. altitude used in exponential */
    float ob_height_here;   /* obstacle height here (i.e. at particle's X,Y) */
    int cleared_obstacle;   /* 1 if particle has cleared obstacle, 0 otherwise */
} vparticle_type;  /* vent particle typedef */ typedef struct {
```

APPENDIX D

```c
    vparticle_type vparticles[MAX_PARTICLES_PER_VENT]; /* vent particles */
    int new_per_frame;
    int number_vent_particles;
    float init_half_width;
    float xinit[MAX_NEW]; /* init X of vent particle */
    float yinit[MAX_NEW]; /* init Y of vent particle */
    float loc_x;    /* loc xyz stores a test point used to determine distance */
    float loc_y;    /* from eyepoint to vent. */
    float loc_z;
    float left;     /* X or Y position of left side of vent */
    float ob_slope;
    double accum_outflow; /* Accumulated outflow through a vent. */
} vent_data_type;

/* note that each vent's particles are stored separately.  This is
   necessary so that we can sort the vent plumes with respect to each other
   in order to draw them back to front. */ static vent_data_type vent_data[FIRE_INTERFACE_MAX_VENTS];
static int vent_order[FIRE_INTERFACE_MAX_VENTS];
static fire_interface_type *fire_data;
static double room_min_x;
static double room_max_x;
static double room_min_y;
static double room_max_y;

extern int texture_on;
extern int outside_room;
extern float Tod;

/* ===================================================================== */

/*
-- init_vent_smoke
--
-- Initializes vent smoke data
--
*/ void init_vent_smoke()

/***************************************************/
    register int i, j;
    vent_data_type *vd;
    usptr_t *fire_data_arena;

void determine_vent_parameters(fire_interface_type *fd);
/***************************************************/ fire_data_arena = usinit (FIRE_INTERFACE_ARENA_NAME);
    fire_data = usgetinfo (fire_data_arena);

/* initialize some arrays */ for (i = 0; i < FIRE_INTERFACE_MAX_VENTS; i++) {
        vd = &(vent_data[i]);
        for (j = 0; j < MAX_PARTICLES_PER_VENT; j++) {
            vd->vparticles[j].frames_remaining = 0;
        } /* end for */
        vd->accum_outflow = 0.0;
```

```
      vd->number_vent_part_les = 0;
   } /* end for loop */

/* set some local global variables */
   room_min_x = -fire_data->wall_thickness;
   room_max_x = fire_data->room_width_x + fire_data->wall_thickness;
   room_min_y = -fire_data->wall_thickness;
   room_max_y = fire_data->room_width_y + fire_data->wall_thickness;

/* Now, for each vent determine initial XYZ position of smoke
      particles released from the vent based on the position of
      the vent.  Also, determine the size of the smoke expansion cone
      and the distance test point of the vent. */ determine_vent_parameters(fire_data);

} /* end init_vent_smoke */

/*
-- cleared_obstacle_or_roof
--
-- This function returns 1 if the particle has cleared the rooftop or
-- obstacle above the vent, otherwise it returns 0.  Once a particle has
-- cleared the obstacle, we no longer need to call this function for that
-- particle because we have the flag cleared_obstacle for each particle.
*/
int cleared_obstacle_or_roof (vent_data_type *vd, int ventnum, int pnum)
{
   /*************************************************************/
   fire_interface_vent_type *vent;
   int cleared;
   double distance_to_clear;
   /*************************************************************/ vent = &(fire_data->vents[ventnum]);

if (! vent->obstacle) {
      /* no obstacle */
      if (vd->vparticles[pnum].position_z < fire_data->room_height)
         return 0;
      else
         return 1;
   } else if (vent->ob_width == 0.0) {
      if (vd->vparticles[pnum].position_z < vd->vparticles[pnum].ob_height_here)
         return 0;
      else
         return 1;
   } else {
      /* Non-zero obstacle width.  If particle is at least its half-width
         beyond obstacle's width (from wall) OR it is above the height of the
         obstacle, then it has cleared the obstacle */ distance_to_clear = vent->ob_width + vd->vparticles[pnum].half_width;
      cleared = 0;
      switch (vent->wall_number)
      {
         case 1:
            if (vd->vparticles[pnum].position_y <
                  (room_min_y - distance_to_clear))
               cleared = 1;
```

090936.0271
Page 47

```
            break;
         case 2:
            if (vd->vparticles[pnum].position_x <
                  (room_min_x - distance_to_clear))
               cleared = 1;
            break;
         case 3:
            if (vd->vparticles[pnum].position_y >
                  (room_max_y + distance_to_clear))
               cleared = 1;
            break;
         case 4:
            if (vd->vparticles[pnum].position_x >
                  (room_max_x + distance_to_clear))
               cleared = 1;
            break;
      }
      return cleared;
   } /* end if */

} /* end cleared_obstacle */

/*
-- near_obstacle
--
-- This function determines if a particle is near enough to an obstacle
-- that it needs to flow around it.  Near enough in this case means that
-- the base of the particle is below the obstacle height AND the top of the
-- particle is within the height of the particle from the obstacle.
--
*/ int near_obstacle(vent_data_type *vd, int pnum)
{
   if ((vd->vparticles[pnum].position_z < vd->vparticles[pnum].ob_height_here)
      && ((vd->vparticles[pnum].position_z + 2.0 * vd->vparticles[pnum].height) >
         vd->vparticles[pnum].ob_height_here) )
      return 1;
   else
      return 0;
} /* near_obstacle */

/* update_vent_particles
--
-- Update vent particles updates the location and expiration of existing
-- vent particles and creates new vent outflow smoke particles.  It also
-- calls a function to sort the vents by distance in order to draw the
-- vent smoke back to front.  Also, this function causes smoke particles
-- to flow around soffits and other obstacles.
-- Notes:
-- 1. Vent particles become more transparent as they approach extinction.
-- 2. The initial transparency of the particles is proportional to the mass
--    outflow of the vent when the mass outflow is low (less than
--    new_per_frame * NPRATE).  Once mass outflow exceeds
--    new_per_frame * NPRATE each frame, opacity is MAX_OPACITY
--    and additional particles are added at a rate proportional to mass outflow.
--    This is to give the effect of faint, mostly transparent smoke early in the
--    fire and thick opaque smoke later in the fire.
-- 3. This function keeps track of accumulated mass outflow in order to
--    determine opacity and/or number of particles to create.
```

```
--  4. New vent particles a_e spread out evenly over t.  top of the vent and are
--     positioned and sized so that they overlap (to give the smoke a continuous
--     appearence when it first emerges from the vent).
--  5. Obstacles can be flat (slope 0.0) or sloped such as a roof line.
--     However, obstacles must be above the height of the burn room.
--  6. Smoke particles are forced to flow up the wall (and possibly around
--     a soffit) until they have cleared the top of the
--     building (or soffit) at which time they start spreading out in X and Y.
--  7. At this time INITIAL velocity is NOT based on a buoyancy calculation, but
--     it does increase with increasing hot layer temperature.  Velocity of a
--     particle falls off with an inverse exponential as it rises in the plume.
*/ void update_vent_particles(pfChannel *chan)
{
   /**************************************************************/
   double Crand2 = 1.0 / (RAND_MAX * 2.0); /* i.e. get range of 0 to 1/2 */
   double rand_val;
   double base_height;
   double dist_top_to_obstacle, zfrac;
   float xdelta, ydelta;
   int num_new_this_vent;
   float new_particle_opacity;
   register int i, ventnum, j, k, index;
   static int frame_count_1 = 1;
   static int frame_count_2 = 1;
   vent_data_type *vd;
   fire_interface_vent_type *vent;
   static float last_posz = -10.0;

void determine_delta_xy(float *xd, float *yd, int v);
   void sort_vents(pfChannel *chan);
   int cleared_obstacle_or_roof(vent_data_type *vd, int v, int p);
   int near_obstacle(vent_data_type *vd, int p);
   float allowed_movement(int ventnum, int i, int direction);
   /**************************************************************/

/* Update all the existing vent particles, remove expired ones.
      Note that we must prevent smoke from going through the building
      walls as the plume expands.  For example, for a vent on wall 2,
      the smoke must have an x-value <= the wall x-value at least until
      it has cleared the top of the building. */ for (ventnum = 0; ventnum < fire_data->number_of_vents; ventnum++) {
      vd = &(vent_data[ventnum]);
      vent = &(fire_data->vents[ventnum]);
      j = 0;
      for (i = 0; i < vd->number_vent_particles; i++) {
         if (vd->vparticles[i].frames_remaining > 0) {

/* While a particle has not yet cleared an obstacle or the roof,
               we restrict its movement and growth.  After it has cleared
               an obstacle or the roof, we allow it to expand and spread out.
               While a particle is flowing around an obstacle we don't let
               it grow to avoid visual problems. */

/* if particle previously had not cleared the obstacle, recheck */
            if (! vd->vparticles[i].cleared_obstacle) {
               vd->vparticles[i].cleared_obstacle =
                  cleared_obstacle_or_roof(vd, ventnum, i);
```

```
   }
   if (! vd->vparticles[i].cleared_obstacle) {
      if (! vent->obstacle || vent->ob_width == 0.0
         || (! near_obstacle(vd,i)))
      {
         /* particle simply flows up */
         vd->vparticles[j].position_x = vd->vparticles[i].position_x;
         vd->vparticles[j].position_y = vd->vparticles[i].position_y;
         vd->vparticles[j].position_z = vd->vparticles[i].position_z
            + (vd->vparticles[i].velocity * SECONDS_PER_FRAME);
         vd->vparticles[j].half_width = vd->vparticles[i].half_width
            + (HALF_WIDTH_GROWTH_RATE * SECONDS_PER_FRAME);
         vd->vparticles[j].height = 2.0 * vd->vparticles[j].half_width;
      } else {
         /* particle is near an obstacle of non-zero width and must
            move around it. Note, zfrac goes from 1.0 down to 0.0
            as particle gets closer to obstacle. */
         dist_top_to_obstacle = vd->vparticles[i].ob_height_here -
            (vd->vparticles[i].position_z + vd->vparticles[i].height);
         zfrac = dist_top_to_obstacle / vd->vparticles[i].height;

if (zfrac < 0.0) zfrac = 0.0;
         else if (zfrac > 1.0) zfrac = 1.0;

/* now, figure out velocities and move the particle */
         switch (vent->wall_number)
         {
            case 1:
               vd->vparticles[j].position_x =
                  vd->vparticles[i].position_x;
               vd->vparticles[j].position_y =
                  vd->vparticles[i].position_y - ((1.0 - zfrac) *
                  vd->vparticles[i].velocity * SECONDS_PER_FRAME);
               vd->vparticles[j].position_z =
                  vd->vparticles[i].position_z + (zfrac *
                  vd->vparticles[i].velocity * SECONDS_PER_FRAME);
               break;
            case 2:
               vd->vparticles[j].position_y =
                  vd->vparticles[i].position_y;
               vd->vparticles[j].position_x =
                  vd->vparticles[i].position_x - ((1.0 - zfrac) *
                  vd->vparticles[i].velocity * SECONDS_PER_FRAME);
               vd->vparticles[j].position_z =
                  vd->vparticles[i].position_z + (zfrac *
                  vd->vparticles[i].velocity * SECONDS_PER_FRAME);
               break;
            case 3:
               vd->vparticles[j].position_x =
                  vd->vparticles[i].position_x;
               vd->vparticles[j].position_y =
                  vd->vparticles[i].position_y + ((1.0 - zfrac) *
                  vd->vparticles[i].velocity * SECONDS_PER_FRAME);
               vd->vparticles[j].position_z =
                  vd->vparticles[i].position_z + (zfrac *
                  vd->vparticles[i].velocity * SECONDS_PER_FRAME);
               break;
            case 4:
               vd->vparticles[j].position_y =
```

```
                    vd->vparticles[i].position_y;
                vd->vparticles[j].position_x =
                    vd->vparticles[i].position_x + ((1.0 - zfrac) *
                    vd->vparticles[i].velocity * SECONDS_PER_FRAME);
                vd->vparticles[j].position_z =
                    vd->vparticles[i].position_z + (zfrac *
                    vd->vparticles[i].velocity * SECONDS_PER_FRAME);
                break;
            } /* end switch */ vd->vparticles[j].half_width = vd->vparticles[i].half_width;
            vd->vparticles[j].height = vd->vparticles[i].height;
        }
    } else {
        /* Particle has cleared the obstacle at least in the XY plane.
           If it still has to clear it in height (Z), only move the
           particle up, otherwise allow it to flow out
           and grow freely.  EXCEPT, if we just move a particle up,
           then the particles stack up like a deck of cards when
           viewed from the side, so let those particles that want
           to move away from the wall do so (via call to
           allowed_movement()). */ if (vd->vparticles[i].position_z <
            vd->vparticles[i].ob_height_here) {
            vd->vparticles[j].position_x = allowed_movement(ventnum,i,X);
            vd->vparticles[j].position_y = allowed_movement(ventnum,i,Y);
            vd->vparticles[j].position_z = vd->vparticles[i].position_z
                + (vd->vparticles[i].velocity * SECONDS_PER_FRAME);
            vd->vparticles[j].half_width = vd->vparticles[i].half_width;
            vd->vparticles[j].height = vd->vparticles[i].height;
        } else {
            vd->vparticles[j].position_x =
                vd->vparticles[i].position_x + vd->vparticles[i].delta_x;
            vd->vparticles[j].position_y =
                vd->vparticles[i].position_y + vd->vparticles[i].delta_y;
            vd->vparticles[j].position_z = vd->vparticles[i].position_z
                + (vd->vparticles[i].velocity * SECONDS_PER_FRAME);
            vd->vparticles[j].half_width = vd->vparticles[i].half_width
                + (HALF_WIDTH_GROWTH_RATE * SECONDS_PER_FRAME);
            vd->vparticles[j].height = 2.0 * vd->vparticles[j].half_width;
        } /* end if */

} /* end if */

/* copy and/or update particle's data and in the process remove
       expired particles */ vd->vparticles[j].ob_height_here = vd->vparticles[i].ob_height_here;
    vd->vparticles[j].cleared_obstacle =
        vd->vparticles[i].cleared_obstacle;
    vd->vparticles[j].delta_x = vd->vparticles[i].delta_x;
    vd->vparticles[j].delta_y = vd->vparticles[i].delta_y;
    vd->vparticles[j].frames_remaining =
        vd->vparticles[i].frames_remaining - 1;
    vd->vparticles[j].first_frames = vd->vparticles[i].first_frames + 1;
    vd->vparticles[j].ivelocity = vd->vparticles[i].ivelocity;
    vd->vparticles[j].inv_max_alt = vd->vparticles[i].inv_max_alt;
    vd->vparticles[j].age = vd->vparticles[i].age + SECONDS_PER_FRAME;
    vd->vparticles[j].final_opacity = vd->vparticles[i].final_opacity;
```

```
        if (vd->vparticles[j].first_frames < NUM_FIRST_FRAMES) {
            /* fade-on particle */
            vd->vparticles[j].opacity = vd->vparticles[j].final_opacity *
                ((float)vd->vparticles[j].first_frames / NUM_FIRST_FRAMES);
        } else
            if (vd->vparticles[j].frames_remaining < START_VPARTICLE_FADE) {
                /* fade off particle */
                vd->vparticles[j].opacity = vd->vparticles[i].opacity * 0.95;
            } else {
                /* no change in opacity */
                vd->vparticles[j].opacity = vd->vparticles[i].final_opacity;
            }

/* Last, compute this particle's next frame velocity which falls
           off with inverse exponential */
        /*
           At this time this inverse exponential change in velocity does not
           seem to be necessary.  The code is left here in case it is desired
           to use it at a later date.  Also, the baggage of the ivelocity,
           age and inv_max_alt fields is still int place for computing this.

vd->vparticles[j].velocity = vd->vparticles[j].ivelocity *
               expf(-(vd->vparticles[j].age * vd->vparticles[j].ivelocity *
               vd->vparticles[j].inv_max_alt));
        */ vd->vparticles[j].velocity = vd->vparticles[i].velocity * 0.999;

j++;

} /* end if */
    } /* end for each vent particle */ vd->number_vent_particles = j;
} /* end for each vent */

/* Add new vparticles for each vent. */ for (ventnum = 0; ventnum < fire_data->number_of_vents; ventnum++) {
    vd = &(vent_data[ventnum]);
    vent = &(fire_data->vents[ventnum]);

if (vent->open && vent->mass_outflow_rate > 0.0) {

/* Number of new particles per frame is constant early in the
           simulation but may increase later.  Early in the simulation these
           particles are initially fairly transparent, but later they are
           initially opaque. */ vd->accum_outflow += (vent->mass_outflow_rate * SECONDS_PER_FRAME);

/* determine how many new particles need to be created and what their
           initial opacity should be.  When we only create new_per_frame
           number of particles, the opacity is proportional to the mass
           outflow of the vent.  NOTE: we only create particles every
           NFRAMES frames. */ if (frame_count_2 != NFRAMES) {
            /* don't create any new particles this frame, we just keep
```

```
         track of ac _m_outflow (above). */
      num_new_this_vent = 0;
   } else if (vd->accum_outflow < vd->new_per_frame * NPRATE) {
      /* the particles are initially semi-transparent */
      num_new_this_vent = vd->new_per_frame;
      new_particle_opacity =
         0.2 + (vd->accum_outflow / (NPRATE * vd->new_per_frame));
      if (new_particle_opacity > MAX_OPACITY)
         new_particle_opacity = MAX_OPACITY;

/* now subtract the amount of outflow we will "release" as smoke,
         i.e.  all of it.  */
      vd->accum_outflow = 0.0;
   }
   else {
      /* particles are initially opaque and we may create more than
         new_per_frame this frame */
      num_new_this_vent = (int) (vd->accum_outflow / (float) NPRATE);
      new_particle_opacity = MAX_OPACITY;
      /* now subtract the amount of outflow we will "release" as smoke */
      vd->accum_outflow -= ((float) num_new_this_vent * NPRATE);
   } if (num_new_this_vent + vd->number_vent_particles
         > MAX_PARTICLES_PER_VENT) {
      num_new_this_vent = MAX_PARTICLES_PER_VENT - vd->number_vent_particl
   } /* end if */

/* determine life, size, initial position and final destination of each
      new particle. */ index = 0;

for (k = 0; k < num_new_this_vent; k++) {
      i = vd->number_vent_particles + k;
      vd->vparticles[i].frames_remaining =
         (rand () % (MAX_VPARTICLE_LIFE - MIN_VPARTICLE_LIFE))
         + MIN_VPARTICLE_LIFE;
      vd->vparticles[i].first_frames = 1;
      vd->vparticles[i].ivelocity = INIT_VPART_VELOCITY
         + ((fire_data->hot_layer_temperature
             - fire_data->outside_temperature) / DELTAK);
      vd->vparticles[i].velocity = vd->vparticles[i].ivelocity;
      vd->vparticles[i].inv_max_alt = 1.0 / (vd->vparticles[i].ivelocity
         * MAX_VPARTICLE_LIFE * SECONDS_PER_FRAME);
      vd->vparticles[i].age = 0.0;
      vd->vparticles[i].final_opacity = new_particle_opacity;
      vd->vparticles[i].opacity = vd->vparticles[i].final_opacity *
         ((float)vd->vparticles[i].first_frames / NUM_FIRST_FRAMES);
      vd->vparticles[i].half_width = vd->init_half_width;
      vd->vparticles[i].height = 2.0 * vd->init_half_width;
      vd->vparticles[i].cleared_obstacle = 0;

/* particles are initially placed at known locations along the
         top of the vent with just a little bit of randomness thrown
         in--between (+/-)1/4 of particle size).  The initial base
         of the particles is at the hot layer base, clamped to the
         bottom of the vent. */
      base_height = vent->base_height;
      rand_val = (rand () * Crand2 - 0.25) * (2.0 * vd->init_half_width);
```

```c
            if (vent->wall_number == 1 || vent->wall_number == 3) {
               vd->vparticles[i].position_x = vd->xinit[index] + rand_val;
               vd->vparticles[i].position_y = vd->yinit[index];
               vd->vparticles[i].position_z =
                  (fire_data->hot_layer_height > base_height) ?
                  fire_data->hot_layer_height : base_height;
               if (vent->obstacle) {
                  vd->vparticles[i].ob_height_here = vent->ob_left_height +
                     (fabs(vd->vparticles[i].position_x - vd->left) *
                     vd->ob_slope);
               } /* end if */
            } else {
               vd->vparticles[i].position_x = vd->xinit[index];
               vd->vparticles[i].position_y = vd->yinit[index] + rand_val;
               vd->vparticles[i].position_z =
                  (fire_data->hot_layer_height > base_height) ?
                  fire_data->hot_layer_height : base_height;
               if (vent->obstacle) {
                  vd->vparticles[i].ob_height_here = vent->ob_left_height +
                     (fabs(vd->vparticles[i].position_y - vd->left) *
                     vd->ob_slope);
               } /* end if */
            } /* end if */ index++;
            index = index % vd->new_per_frame; /* cycle initial x,y,z values */ determine_delta_xy(&xdelta, &ydelta, ventnum);
            vd->vparticles[i].delta_x = xdelta;
            vd->vparticles[i].delta_y = ydelta;

} /* end for loop */ vd->number_vent_particles += num_new_this_vent;

} else {
         /* vent is closed or no mass outflow, so zero its accumulator */
         vd->accum_outflow = 0.0;
      } /* end if */
   } /* end for each vent */

/* Now, we sort the vents, updating the vent_order array.  We only
      sort 10 times per second (i.e. every third frame).  There shouldn't
      be a need to sort any more often than that. */ if (frame_count_1 == 3) {
      frame_count_1 = 1;
      sort_vents(chan);
   } else {
      frame_count_1++;
   } if (frame_count_2 == NFRAMES) {
      frame_count_2 = 1;
/*
   fprintf(stderr,"numpart vent1=%d, numpart vent2=%d\n",
      vent_data[0].number_vent_particles, vent_data[1].number_vent_particles);
*/
   } else {
      frame_count_2++;
```

```
    }

} /* end update_vent_particles */
/*
-- allowed_movement
--
-- Returns a new X or Y position for a smoke particle, or its previous
-- position if movement is not allowed in the specified direction.  This
-- function is only called when a smoke particle has cleared an obstacle in
-- X and Y, but has not yet cleared it in Z.  This function prevents
-- smoke particles from stacking up like a deck of cards when viewed from
-- the side during this part of the smoke flow.
*/
float allowed_movement(int vnum, int i, int direction)
{
    /****************************************************************/
    vent_data_type *vd;
    fire_interface_vent_type *vent;
    /****************************************************************/ vd = &(vent_data[vnum]);
    vent = &(fire_data->vents[vnum]);

switch (vent->wall_number)
    {
        case 1:
            if (direction == Y && vd->vparticles[i].delta_y < 0.0) {
                /* allow movement */
                return(vd->vparticles[i].position_y + vd->vparticles[i].delta_y);
            } else if (direction == Y) {
                return(vd->vparticles[i].position_y);   /* don't allow movement */
            } else if (direction == X) {
                return(vd->vparticles[i].position_x);   /* don't allow movement */
            }
            break;
        case 2:
            if (direction == X && vd->vparticles[i].delta_x < 0.0) {
                /* allow movement */
                return(vd->vparticles[i].position_x + vd->vparticles[i].delta_x);
            } else if (direction == X) {
                return(vd->vparticles[i].position_x);   /* don't allow movement */
            } else if (direction == Y) {
                return(vd->vparticles[i].position_y);   /* don't allow movement */
            }
            break;
        case 3:
            if (direction == Y && vd->vparticles[i].delta_y > 0.0) {
                /* allow movement */
                return(vd->vparticles[i].position_y + vd->vparticles[i].delta_y);
            } else if (direction == Y) {
                return(vd->vparticles[i].position_y);   /* don't allow movement */
            } else if (direction == X) {
                return(vd->vparticles[i].position_x);   /* don't allow movement */
            }
            break;
        case 4:
            if (direction == X && vd->vparticles[i].delta_x > 0.0) {
                /* allow movement */
                return(vd->vparticles[i].position_x + vd->vparticles[i].delta_x);
```

```
        } else if (direction == X) {
            return(vd->vparticles[i].position_x);   /* don't allow movement */
        } else if (direction == Y) {
            return(vd->vparticles[i].position_y);   /* don't allow movement */
        }
        break;
    } /* end switch */

} /* end allowed_movement */

/*
-- determine_vent_parameters
--
-- This function determines the initial X, Y and Z location of vent
-- smoke particles.  It determines how many smoke particles are created
-- from a vent per frame to achieve the appearance of an "inverted waterfall".
-- This function determines smoke placement parameters per vent.  This
-- function determines the size of the smoke expansion cone which is
-- related to the vent width.
-- This function computes the xyz test point used to determine
-- the distance from the eyepoint to the vent.
-- Note that we only need to calculate these initial positions once at the
-- beginning of the fire model simulation and this function should only
-- be called once--when this module is initialized.
*/ void determine_vent_parameters(fire_interface_type *d)
{
/**************************************************************/
    register int vent, i;
    vent_data_type *vd;
    float vent_left_x, vent_left_y;
    float fraction, spread_distance, quarter_width;
/**************************************************************/ for (vent = 0; vent < d->number_of_vents; vent++) { vd = &(vent_data[vent]);

/* compute obstacle information */
        if (d->vents[vent].obstacle) {
            vd->ob_slope =
                (d->vents[vent].ob_right_height - d->vents[vent].ob_left_height) /
                d->vents[vent].width;
        } else {
            vd->ob_slope = 0.0;
        } /* end if */

/* Determine how many vent particles fit across the vent.  We create
            one more than that number (so they will overlap).  We try to use the
            default particle size, but if that would create too many smoke
            particles we create larger particles.  We have to accomodate both
            small narrow vents and large ones yet not exceed our limit of maximum
            number of particles per vent. */ vd->new_per_frame =
            (int) ((d->vents[vent].width / VPARTICLE_HEIGHT) + 0.5) + 1;

/* if necessary, clamp new_per_frame to maximum allowable number */
        if (vd->new_per_frame > MAX_NEW) {
```

```
   vd->new_per_frame = MAX_NEW;
} /* end if */

/* determine size of particle. Note we divide by vd->new_per_frame - 1
   so particles are large enough to overlap. */ vd->init_half_width =
    (d->vents[vent].width / (float)(vd->new_per_frame - 1)) / 2.0;

/* now compute xinit and yinit values for this vent. For example, if there
   new_per_frame is 4, then we compute four X and four Y positions
   spread evenly over the vent +/- 1/4 of particle width.  The plus
   or minus 1/4 width ensures that the opaque part of the smoke texture
   extends out to both sides of the vent. Some slight randomness in X or Y
   position is provided at the time the particle is created.  We
   define positions such that there is some overlap of smoke particles.
   Also, compute the xyz test point used to determine the distance
   from the eyepoint to the vent. */ spread_distance = d->vents[vent].width + vd->init_half_width;
fraction = spread_distance / (vd->new_per_frame + 1);
quarter_width = 0.5 * vd->init_half_width;

switch(d->vents[vent].wall_number)
{
    case 1:  /* wall parallel to X axis */
        vent_left_x = 0.5 * (d->room_width_x - d->vents[vent].width);
        for (i = 0; i < vd->new_per_frame; i++) {
            vd->xinit[i] = (vent_left_x - quarter_width) +
                (i + 1.0) * fraction;
            vd->yinit[i] = -d->wall_thickness - vd->init_half_width;
        }
        vd->left = vent_left_x;
        vd->loc_x = 0.5 * d->room_width_x;
        vd->loc_y = -d->wall_thickness;
        vd->loc_z = d->vents[vent].top_height;
        break;
    case 2:  /* wall parallel to Y axis */
        vent_left_y = 0.5 * (d->room_width_y + d->vents[vent].width);
        for (i = 0; i < vd->new_per_frame; i++) {
            vd->xinit[i] = -d->wall_thickness - vd->init_half_width;
            vd->yinit[i] = (vent_left_y + quarter_width) -
                (i + 1.0) * fraction;
        }
        vd->left = vent_left_y;
        vd->loc_x = -d->wall_thickness;
        vd->loc_y = 0.5 * d->room_width_y;
        vd->loc_z = d->vents[vent].top_height;
        break;
    case 3:  /* wall parallel to X axis */
        vent_left_x = 0.5 * (d->room_width_x + d->vents[vent].width);
        for (i = 0; i < vd->new_per_frame; i++) {
            vd->xinit[i] = (vent_left_x + quarter_width) -
                (i + 1.0) * fraction;
            vd->yinit[i] = d->room_width_y + d->wall_thickness
                + vd->init_half_width;
        }
        vd->left = vent_left_x;
        vd->loc_x = 0.5 * d->room_width_x;
        vd->loc_y = d->room_width_y + d->wall_thickness;
```

```
                vd->loc_z = d->vents[vent].top_height;
                break;
            case 4:  /* wall parallel to Y axis */
                vent_left_y = 0.5 * (d->room_width_y - d->vents[vent].width);
                for (i = 0; i < vd->new_per_frame; i++) {
                    vd->xinit[i] = d->room_width_x + d->wall_thickness
                        + vd->init_half_width;
                    vd->yinit[i] = (vent_left_y - quarter_width) +
                        (i + 1.0) * fraction;
                }
                vd->left = vent_left_y;
                vd->loc_x = d->room_width_x + d->wall_thickness;
                vd->loc_y = 0.5 * d->room_width_y;
                vd->loc_z = d->vents[vent].top_height;
                break;
        } /* end switch */
    } /* end for */
} /* end determine_vent_parameters */

/*
-- determine_delta_xy
--
-- This function determines the destination delta X and Y values of a vent
-- smoke particle.  All particles have the same magnitude of velocity, but
-- a random heading in the XY-plane.
*/ void determine_delta_xy(float *xdelta, float *ydelta, int ventnum)
{
    /****************************************************/
    static double Crand = 1.0 / RAND_MAX;
    double heading, velocity_x, velocity_y;
    double factor;
    fire_interface_vent_type *vent;
    /****************************************************/ heading = ((rand() * Crand * 2.0) - 1.0) * PI;  /* i.e. +/- PI */
    velocity_x = XYVELOCITY * cos(heading);
    velocity_y = XYVELOCITY * sin(heading);

/* we give slightly more velocity in the Y direction when vent is
       along a wall parallel to the X-axis and vice versa.  This is because
       particles are already spaced-out some along the wall.  Also we
       add some randomness in the same direction so the fanout doesn't
       look too regular. */ vent = &(fire_data->vents[ventnum]);

factor = (rand() * Crand) + 0.4;  /* i.e. range of 1.0 to 1.4 */
    if (vent->wall_number == 1 || vent->wall_number == 3) {
        velocity_y *= factor;
    } else {
        /* wall 2 or 4 */
        velocity_x *= factor;
    } /* end if */

/* compute per frame x and y delta */
    *xdelta = velocity_x * SECONDS_PER_FRAME;
    *ydelta = velocity_y * SECONDS_PER_FRAME;
```

} /* end determine_delta_xy */

/*
-- sort_vents
--
-- This function updates the vent_order array. The vent order array
-- stores the drawing order of vents. draw_vent_smoke uses the array
-- to draw the vent smoke in back-to-front order.
--
*/
```
void sort_vents(pfChannel *chan)
{
    /****************************************************************/
    pfVec3 eye_xyz, hpr;
    register int v, w;
    int tempi;
    double xdiff, ydiff, zdiff, tempd;
    double distance[FIRE_INTERFACE_MAX_VENTS]; /* stores distance squared */
    /****************************************************************/

/* for each vent, determine the distance from eye point to the vent.
       At the same time, (re)initialize the vent order array. */ pfGetChanView (chan, eye_xyz, hpr);
    for (v = 0; v < fire_data->number_of_vents; v++) {
        xdiff = vent_data[v].loc_x - eye_xyz[0];
        ydiff = vent_data[v].loc_y - eye_xyz[1];
        zdiff = vent_data[v].loc_z - eye_xyz[2];
        distance[v] = xdiff * xdiff + ydiff * ydiff + zdiff * zdiff;

/* (re)initialize the vent order array */
        vent_order[v] = v;
    } /* end for */

/* "sort" the vents by constructing the vent order array */ for (v = 0; v < fire_data->number_of_vents; v++) {
        for (w = v + 1; w < fire_data->number_of_vents; w++) {
            if (distance[w] > distance[v]) {
                /* swap w, v */
                tempd = distance[v];
                distance[v] = distance[w];
                distance[w] = tempd;

tempi = vent_order[v];
                vent_order[v] = vent_order[w];
                vent_order[w] = tempi;
            }
        } /* end for */
    } /* end for */
/* end sort_vents */
/* ====================================================================== */
void draw_vent_smoke (pfChannel *chan)
{
    /****************************************************************/
    pfVec3 xyz, hpr;
```

```c
float sh, ch;
float pos[3];
static float color_alpha[] = {0.20, 0.20, 0.20, 1.0};
register int i, ventnum;
int vent_select;
static float txcoord[][2] = {{0.0, 0.0}, {1.0, 0.0}, {1.0, 1.0}, {0.0, 1.0}};
vent_data_type *vd;
pfVec3 vec1, vec2;
/****************************************************************/

/* we only draw vent smoke if the viewpoint is outside of the building */
if (outside_room) {
    /* Get the orientation and position of the current viewpoint. */ pfGetChanView (chan, xyz, hpr);
    pfSinCos (hpr[0], &sh, &ch);

/* Draw the vent release smoke. */ lmbind (MATERIAL, 0);

if (texture_on) {
        texbind(TX_TEXTURE_0, SMOKE_TEX1);
        tevbind(TV_ENV0, SMOKE_TENV);
    } else {
        texbind(TX_TEXTURE_0, 0);
        tevbind(TV_ENV0, 0);
    } color_alpha[0] = 0.2 * Tod;   /* fade to black at night */
    color_alpha[1] = 0.2 * Tod;
    color_alpha[2] = 0.2 * Tod;

/* draw plumes back to front per the vent_order array */ for (ventnum = 0; ventnum < fire_data->number_of_vents; ventnum++) {
        vent_select = vent_order[ventnum];
        vd = &(vent_data[vent_select]);

/* Now draw this vent's particles */
        /* Note the reverse order (decrement i) below is important */ for (i = vd->number_vent_particles - 1; i >= 0; i--) { color_alpha[3] = vd->vparticles[i].opacity;
            c4f (color_alpha);

bgnpolygon ();
            pos[0] = vd->vparticles[i].position_x +
                ch * vd->vparticles[i].half_width;
            pos[1] = vd->vparticles[i].position_y +
                sh * vd->vparticles[i].half_width;
            pos[2] = vd->vparticles[i].position_z;
            t2f (txcoord[1]);
            v3f (pos);
            pos[2] += vd->vparticles[i].height;
            t2f (txcoord[2]);
            v3f (pos);
            pos[0] -= 2.0 * ch * vd->vparticles[i].half_width;
            pos[1] -= 2.0 * sh * vd->vparticles[i].half_width;
```

```
        t2f (txcoord[3]);
        v3f (pos);
        pos[2] -= vd->vparticles[i].height;
        t2f (txcoord[0]);
        v3f (pos);
        endpolygon ();
      } /* end for loop */
    } /* end for each vent */

/* turn "off" texture if it was on.  avoid inheritance problems. */
    if (texture_on) {
        texbind(TX_TEXTURE_0, 0);
        tevbind(TV_ENV0, 0);
    }
  } /* end if */
} /* end draw_vent_smoke */

/* ============================================================================ */
```

What is claimed is:

1. A method of using a computer to generate data representing a three-dimensional display of a fire, comprising the steps of:
   obtaining fire data from a fire model, said fire model being a set of mathematical expressions that describe the behavior of said fire in terms of computational data elements that may be on fire;
   accessing viewpoint data that describes a field of view to said fire;
   generating a set of fire particles, each of said fire particles having associated parameters, namely, at least three-dimensional location data and transparency data;
   wherein said generating step is performing by using said fire data to determine said parameters;
   assigning a graphics primitive to each said particle, thereby providing a set of fire data elements;
   culling said data elements to determine which are in said field of view; and
   sorting said data elements to determine an order for rasterizing said data elements.

2. The method of claim 1, wherein computational data elements of said model each have an associated position and mass consumption rate parameter.

3. The method of claim 2, wherein said computational data elements of said model are geometric disks.

4. The method of claim 2, wherein said computational data elements are points of a grid.

5. The method of claim 1, wherein said generating step is performed by using a mass consumption rate of said model to determine the number and density of said particles.

6. The method of claim 1, wherein said fire particles are comprised of flame particles and smoke particles.

7. The method of claim 2, wherein the number of said flame particles is determined by fire height and radius values provided by said model.

8. The method of claim 1, wherein said particles are smoke particles and said location data is determined along a path is determined by zone data provided by said fire model.

9. The method of claim 1, wherein said particles are smoke particles and said location data is determined by wind data provided by said fire model.

10. The method of claim 1, wherein said graphics primitives are billboards, each associated with a texture.

11. The method of claim 10, wherein said billboards have an associated color.

12. The method of claim 1, wherein said graphics primitives are splats.

13. The method of claim 1, wherein said particle parameters include color and wherein said generating step is performed by obtaining a color value for each said particle based on material data provided by said model.

14. The method of claim 1, further comprising the step of calculating an illumination value based on said fire data, said illumination value representing illumination from said fire.

* * * * *